US011713172B2

(12) United States Patent
Kodama et al.

(10) Patent No.: US 11,713,172 B2
(45) Date of Patent: Aug. 1, 2023

(54) SHEET MATERIAL CONTAINER

(71) Applicants: Fuji Seal International, Inc., Osaka (JP); Kao Corporation, Tokyo (JP)

(72) Inventors: Daisuke Kodama, Tokyo (JP); Takahiro Otsuka, Tokyo (JP); Atsushi Yamamoto, Tokyo (JP)

(73) Assignee: Fuji Seal International, Inc., Osaka (JP)

( * ) Notice: Subject to any disclaimer, the term of this patent is extended or adjusted under 35 U.S.C. 154(b) by 0 days.

(21) Appl. No.: 17/640,670

(22) PCT Filed: Sep. 2, 2020

(86) PCT No.: PCT/JP2020/033206
§ 371 (c)(1),
(2) Date: Mar. 4, 2022

(87) PCT Pub. No.: WO2021/049385
PCT Pub. Date: Mar. 18, 2021

(65) Prior Publication Data
US 2022/0324624 A1 Oct. 13, 2022

(30) Foreign Application Priority Data

Sep. 9, 2019 (JP) .................................. 2019-163883
Apr. 1, 2020 (JP) .................................. 2020-066271

(51) Int. Cl.
*B65D 65/40* (2006.01)
*B32B 7/05* (2019.01)
(Continued)

(52) U.S. Cl.
CPC ................ *B65D 65/40* (2013.01); *B32B 1/02* (2013.01); *B32B 3/02* (2013.01); *B32B 7/05* (2019.01);
(Continued)

(58) Field of Classification Search
CPC .... B32B 1/02; B32B 3/02; B32B 7/05; B32B 27/08; B32B 27/205; B32B 2038/0028;
(Continued)

(56) References Cited

U.S. PATENT DOCUMENTS

2015/0284144 A1 10/2015 Dytchkowskyj
2017/0355500 A1 12/2017 Nambu et al.
(Continued)

FOREIGN PATENT DOCUMENTS

JP 2012-076305 A 4/2012
JP 2015-214351 12/2015
(Continued)

OTHER PUBLICATIONS

English machine translation of JP6186547. (Year: 2017).*
(Continued)

*Primary Examiner* — Michael C Miggins
(74) *Attorney, Agent, or Firm* — Frost Brown Todd LLP

(57) ABSTRACT

[Problem to be Solved] To prevent delamination of a film layer in a sheet material container in which an enclosing portion is formed in an interlayer between a first film layer and a second film layer.
[Solution] A sheet material container includes a container body 6, and an inner container 7 that is covered by the container body 6 and defines an accommodation space, wherein the container body 6 is formed of a sheet material 3 including a first film layer 1 and a second film layer 2 disposed inside the first film layer 1, the sheet material 3 has a joint portion 32 at which an interlayer between the first film layer 1 and the second film layer 2 is joined and an enclosing portion 51 in which a filler can be enclosed in the interlayer between the first film layer 1 and the second film layer 2, and the first film layer 1 has an extruded multilayer (Continued)

structural part having a polyolefin resin layer 11/an ethylene-vinyl alcohol copolymer resin layer 12 on a side facing the enclosing portion 51.

11 Claims, 24 Drawing Sheets

(51) Int. Cl.
| | | |
|---|---|---|
| *B32B 1/02* | (2006.01) | |
| *B32B 3/02* | (2006.01) | |
| *B32B 27/08* | (2006.01) | |
| *B32B 27/20* | (2006.01) | |
| *B65D 75/00* | (2006.01) | |
| *B65D 75/58* | (2006.01) | |
| *B32B 38/00* | (2006.01) | |

(52) U.S. Cl.
CPC ............ *B32B 27/08* (2013.01); *B32B 27/205* (2013.01); *B65D 75/008* (2013.01); *B65D 75/5866* (2013.01); *B32B 2038/0028* (2013.01); *B32B 2250/03* (2013.01); *B32B 2250/05* (2013.01); *B32B 2250/24* (2013.01); *B65D 2575/58* (2013.01)

(58) Field of Classification Search
CPC ............ B32B 2250/03; B32B 2250/05; B32B 2250/24
See application file for complete search history.

(56) References Cited

U.S. PATENT DOCUMENTS

| | | |
|---|---|---|
| 2019/0077562 A1 | 3/2019 | Nambu et al. |
| 2021/0163181 A1 | 6/2021 | Kodama et al. |

FOREIGN PATENT DOCUMENTS

| | | | |
|---|---|---|---|
| JP | 2015-231845 A | 12/2015 | |
| JP | 2016-084165 A | 5/2016 | |
| JP | 6186547 B1 | 8/2017 | |
| JP | 2018-069642 A | 5/2018 | |
| WO | WO2017043598 A1 * | 3/2017 | ............ B65D 30/16 |
| WO | WO 2021/049385 | 3/2021 | |

OTHER PUBLICATIONS

English machine translation of WO2017043598. (Year: 2017).*
English machine translation of JP2015214351. (Year: 2015).*
International Search Report dated Nov. 17, 2020 for International application No. PCT/JP2020/033206.

* cited by examiner

SHEET MATERIAL CONTAINER

TECHNICAL FIELD

The present invention relates to a sheet material container made of a sheet material.

BACKGROUND ART

Conventionally, a relatively hard container such as a blow-molded container has often been used as a container for accommodating an inclusion such as shampoo. A sheet material container formed of a sheet material has also been used in recent years.

For example, Patent Document 1 discloses a sheet material container including a container body and an inner container covered with the container body, in which the container body has a joint portion which is formed of a sheet material having a first film layer and a second film layer disposed inside the first film layer and in which an interlayer between the first film layer and the second film layer is joined, and an enclosing part in which the interlayer between the first film layer and the second film layer is not joined, and air is enclosed between the non-joined layers.

PRIOR ART DOCUMENT

Patent Document

Patent Document 1: Japanese Patent No. 6186547

SUMMARY OF THE INVENTION

As the first film layer and the second film layer, a laminated film including oriented nylon (or PET)/transparent evaporated PET/oriented nylon/LLDPE is used.

However, when air is enclosed in a container body formed using the laminated film as described above to form an enclosing part, and thus to form a sheet material container, and the sheet material container is left for a long time, there is room for further improvement in suppressing delamination of the laminated film.

Problems to be Solved by the Invention

An object of the present invention is to provide a sheet material container having a container body in which an enclosing portion is formed in the interlayer between a first film layer and a second film layer, in which delamination of the film layer is unlikely to occur.

Solutions to the Problems

A sheet material container of the present invention includes a container body, and an inner container that is covered by the container body and defines an accommodation space, wherein the container body is formed of a sheet material including a first film layer and a second film layer disposed inside the first film layer, the sheet material of the container body has a joint portion at which an interlayer between the first film layer and the second film layer is joined and an enclosing portion in which a filler can be enclosed in the interlayer between the first film layer and the second film layer, and the first film layer has an extruded multilayer structural part having a polyolefin resin layer/an ethylene-vinyl alcohol copolymer resin layer on a side facing the enclosing portion.

In a preferred sheet material container of the present invention, the extruded multilayer structural part of the first film layer has a polyolefin resin layer/an ethylene-vinyl alcohol copolymer resin layer/a polyolefin resin layer.

In a preferred sheet material container of the present invention, the extruded multilayer structural part of the first film layer is formed by coextrusion.

In a preferred sheet material container of the present invention, the second film layer has an extruded multilayer structural part having a polyolefin resin layer/an ethylene-vinyl alcohol copolymer resin layer/a polyolefin resin layer on the side facing the enclosing portion.

In a preferred sheet material container of the present invention, the polyolefin resin layer of the second film layer is a linear low-density polyethylene resin layer.

In a preferred sheet material container of the present invention, the polyolefin resin layer of the first film layer is a linear low-density polyethylene resin layer.

In a preferred sheet material container of the present invention, the first film layer has the extruded multilayer structural part and a polyester resin layer stacked on an outside of the extruded multilayer structural part, and the polyester resin layer constitutes an outer surface of the container body.

In a preferred sheet material container of the present invention, the first film layer has the extruded multilayer structural part and a stretched polyethylene resin layer stacked on an outside of the extruded multilayer structural part, and the stretched polyethylene resin layer constitutes an outer surface of the container body.

In a preferred sheet material container of the present invention, the stretched polyethylene resin layer is formed by biaxial stretching.

In a preferred sheet material container of the present invention, a polyolefin resin layer of the first film layer is a polyethylene resin layer, and an average molecular weight of a polyethylene resin used for the polyethylene resin layer and an average molecular weight of a polyethylene resin used for the stretched polyethylene resin layer are the same.

In a preferred sheet material container of the present invention, the first film layer is formed by melt-extruding a polyethylene resin between the extruded multilayer structural part and the stretched polyethylene resin layer.

In a preferred sheet material container of the present invention, the inner container is formed of an inner container constituent sheet material to which a peripheral edge portion is joined.

In a preferred sheet material container of the present invention, the inner container constituent sheet material has a multilayer film having at least two kinds selected from a polyolefin resin layer, an ethylene-vinyl alcohol copolymer resin layer, and a nylon resin layer.

In a preferred sheet material container of the present invention, a tensile elongation in an MD direction or/and a TD direction of the extruded multilayer structural part of the first film layer is 300% or more and 900% or less.

In a preferred sheet material container of the present invention, the filler is enclosed in the enclosing portion.

Effects of the Invention

The sheet material container of the present invention is less likely to cause delamination of the film layer in a state where the filler is enclosed in the enclosing portion, and can be used stably for a long period of time.

EMBODIMENTS OF THE INVENTION

Hereinafter, the present invention will be described with reference to the drawings.

In the present specification, "outside" refers to a side opposite to an accommodation space of a sheet material container, and "inside" refers to an accommodation space side of the sheet material container.

In the present specification, a numerical range represented by "lower limit XXX to upper limit YYY" means the lower limit XXX or more and the upper limit YYY or less. When a plurality of the numerical ranges are described separately, any lower limit and any upper limit can be selected, and "any lower limit to any upper limit" can be set.

First Embodiment

<Overview of Sheet Material Container>

A sheet material container of the present embodiment includes a container body and an inner container that is an inner container covered by the container body and defines an accommodation space. The container body is formed of a sheet material containing a first film layer and a second film layer disposed inside the first film layer. The sheet material of the container body has a joint portion in which an interlayer between the first film layer and the second film layer is joined and an enclosing portion in which a filler can be enclosed in the interlayer between the first film layer and the second film layer.

The present invention is characterized in that the sheet material container is formed using a sheet material containing a specific film layer.

That is, the main feature of the present invention is that the first film layer has an extruded multilayer structural part having a polyolefin resin layer/an ethylene-vinyl alcohol copolymer resin layer on a side facing the enclosing portion.

In the present invention, any structure can be adopted as the structure of the sheet material container including the container body and the inner container, except that the specific film layer is used. For example, in the present invention, the structure of the sheet material container having the conventionally known enclosing portion as in Patent Document 1 may be adopted, or the structure of the sheet material container having the enclosing portion to be developed after the filing of the present application may be adopted.

As an example of the structure of the sheet material container of the present invention, the structure of the sheet material container disclosed in Patent Document 1 (Japanese Patent No. 6186547) will be briefly described below.

Figure 1:
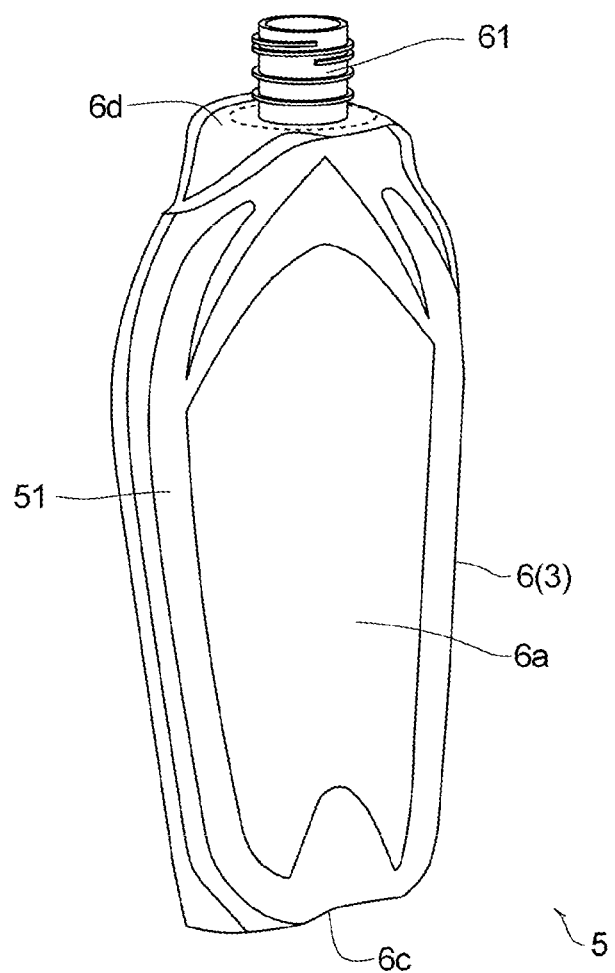
FIG. 1 is a perspective view of a sheet material container of a first embodiment of the present invention in which a filler is enclosed in an enclosing portion.
Figure 2:
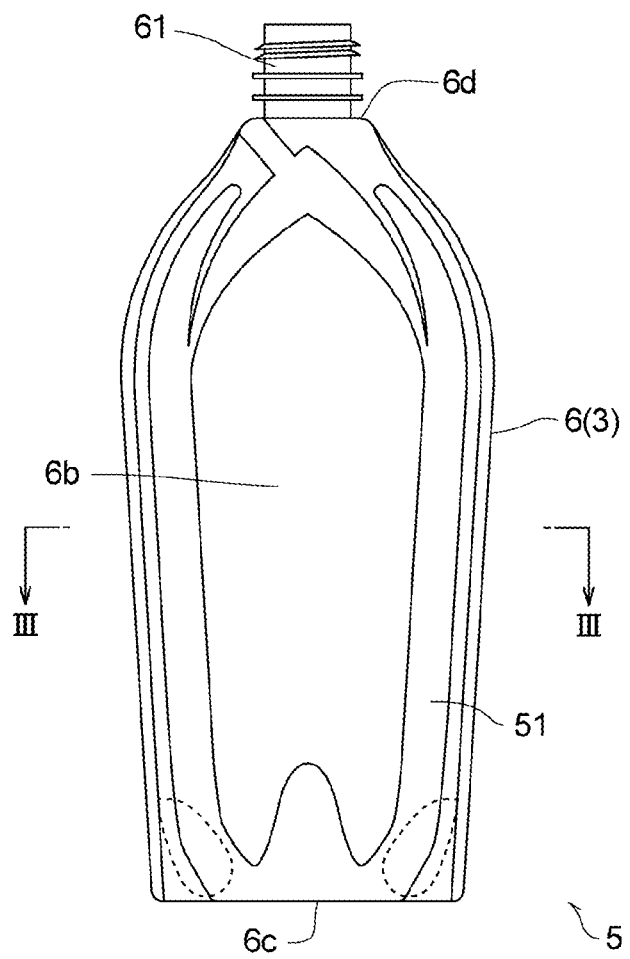
FIG. 2 is a rear view of the sheet material container.
Figure 3A:
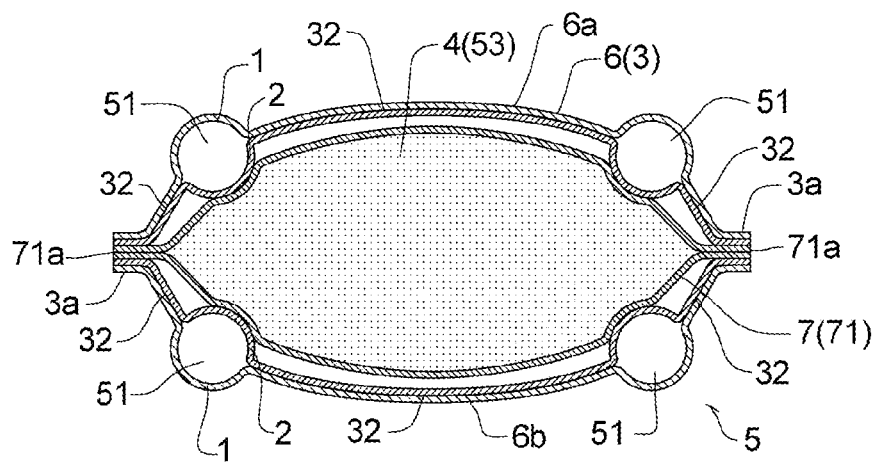
FIG. 3 is an end view taken along the line of FIG. 2. The end view is a view illustrating a shape of only a cut surface and not illustrating a shape on a depth side relative to the cut surface.

FIGS. 1 to 3 illustrate a sheet material container 5 according to the first embodiment.

With reference to FIGS. 1 to 3, the sheet material container 5 has a container body 6 and an inner container 7 provided in the container body 6. The inner container 7 defines an accommodation space 53 for accommodating an inclusion.

The container body 6 is constituted of a sheet material 3 (container body constituent sheet material 3) in which a plurality of film layers (for example, two film layers including a first film layer 1 and a second film layer 2) are stacked.

The inner container 7 may be constituted of a sheet material having one film layer, or may be constituted of a sheet material 71 (inner container constituent sheet material 71) in which a plurality of film layers are stacked.

The container body 6 includes a plurality of planar portions (for example, four planar portions including a first main surface portion 6a, a second main surface portion 6b, a bottom gusset portion 6c, and a top gusset portion 6d). The first main surface portion 6a and the second main surface portion 6b are surrounded by an enclosing portion 51 capable of enclosing the filler therein. FIGS. 1 to 3 illustrate a state after the filler is enclosed in the enclosing portion 51, and the enclosing portion 51 in which the filler is enclosed is three-dimensionally bulged. Examples of the filler include fluids (gas and liquid), solids (for example, powdery/granular materials and resin pellets), and semi-solids (for example, foam materials), and among these fillers, a gas such as air is preferable. For example, a spout 61 is attached to the top gusset portion 6d, if necessary.

The inner container 7 is formed in a bag shape in the container body 6. However, an upper portion of the inner container 7 communicates with an opening portion of the spout 61, and the inclusion can be taken in and out of the accommodation space 53 from the opening portion of the spout 61. In FIG. 3, the inclusion stored in the accommodation space 53 is represented by dots.

Figure 3B:
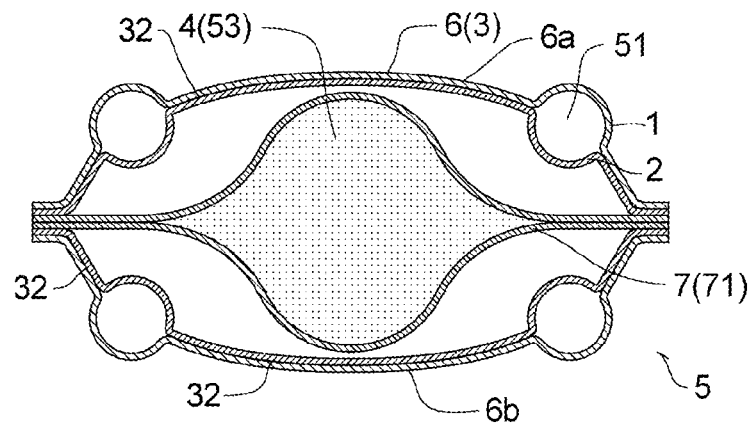

After placing the inclusion in the accommodation space 53 of the inner container 7, a container filled with the inclusion can be obtained by attaching a closing cap (not illustrated) to the spout 61. After removing the closing cap and opening the container filled with the inclusion, the inclusion can be poured out by, for example, tilting the container or pressing the first main surface portion 6a and the second main surface portion 6b of the sheet material container 5. FIG. 3B illustrates a state where a content of the inclusion 4 is reduced after the inclusion 4 is poured out from a state of FIG. 3A where the container is full of the inclusion 4.

Figure 4:
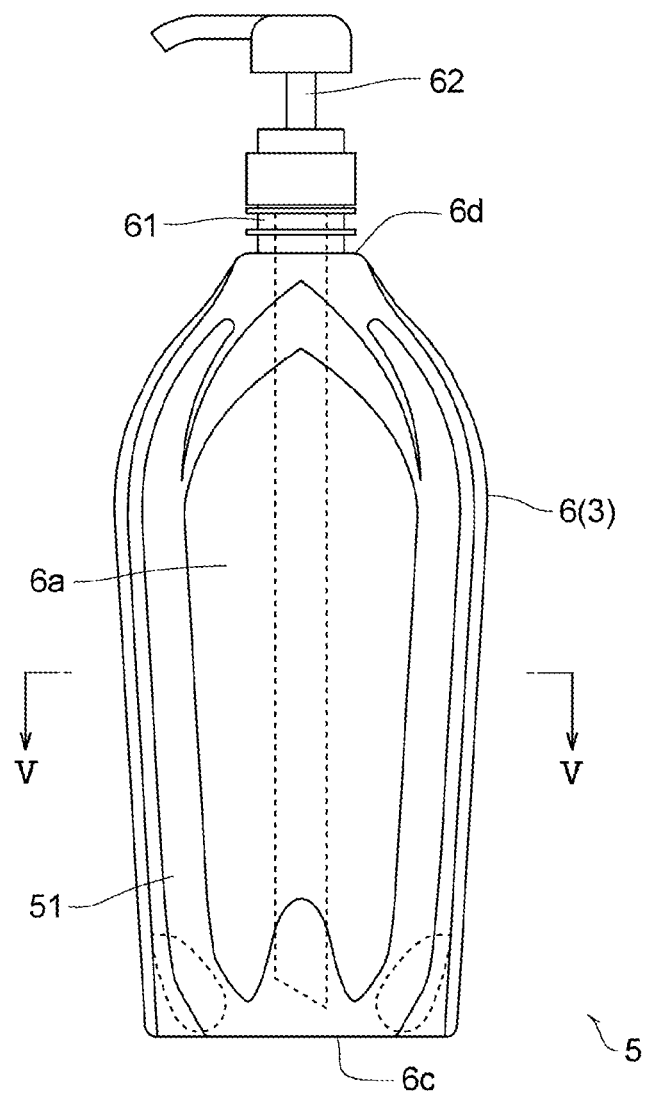
FIG. 4 is a front view of the sheet material container equipped with a cap with a pump.
Figure 5:
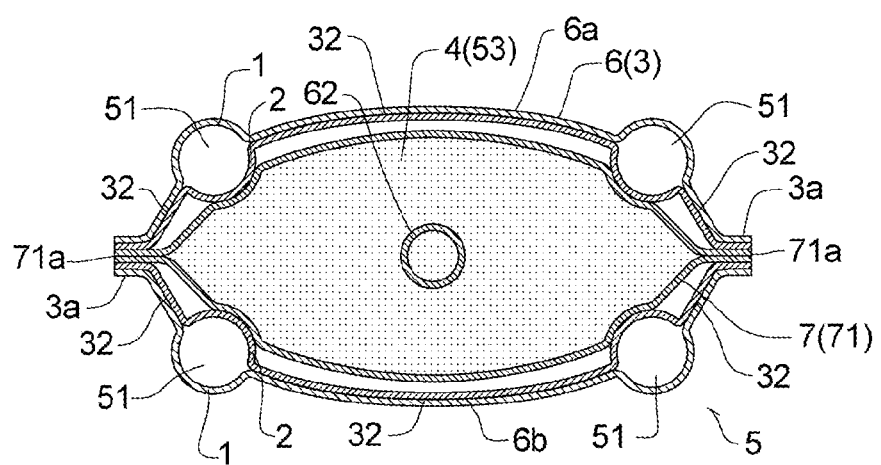
FIG. 5 is a cross-sectional view taken along the line V-V of FIG. 4.

As illustrated in FIGS. 4 and 5, a cap 62 equipped with a pump may be attached to the spout 61 after the inclusion 4 is placed in the accommodation space 53 of the inner container 7.

Although not particularly illustrated, this embodiment is not limited to the case where the spout 61 is attached to the top gusset portion 6d, and for example, a film valve or the like may be provided instead of the spout.

The type of the inclusion is not limited to a particular inclusion, and may be a liquid (including a pasty inclusion) or a solid (for example, a granulated, granular, or powdery inclusion). Specific examples of the inclusions include shampoo, conditioner, body soap, detergent, fabric softener, beverage, and food.

The container body 6 can be self-supporting with the bottom gusset portion 6c as a grounding portion. However, in the present invention, the container body 6 is not limited to a self-supporting form, and may be a form assuming that the container body 6 is laid down without being self-supporting.

<Container Body Constituent Sheet Material>

The sheet material 3 (container body constituent sheet material 3) constituting the container body 6 has a non-joint portion 31 in which an interlayer between the plurality of film layers is not joined, and a joint portion 32 in which the plurality of film layers are joined to each other. The filler can be enclosed in the non-joint portion 31. That is, in the present embodiment, the non-joint portion 31 is the enclosing portion 51 capable of enclosing the filler.

For example, the container body constituent sheet material 3 is constituted of two film layers including the first film layer 1 and the second film layer 2.

Figure 6:
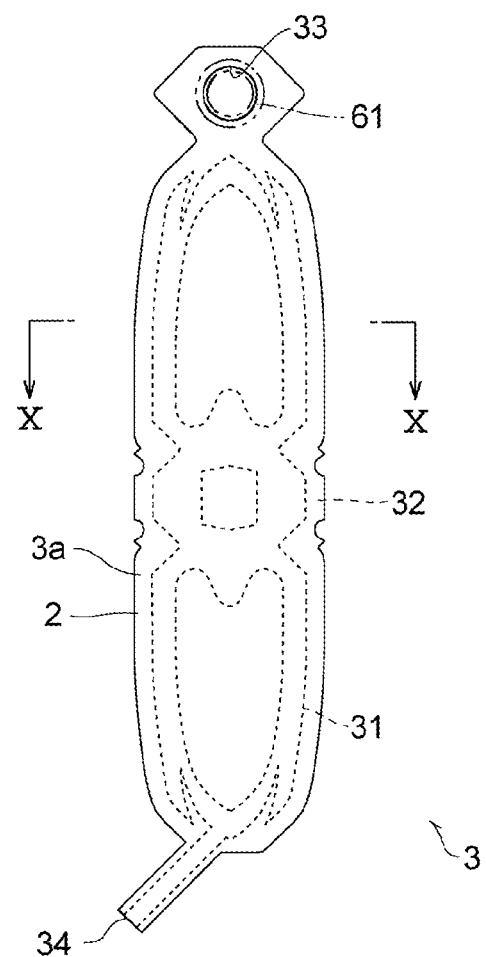
FIG. 6 is a plan view of a sheet material constituting a container body of the sheet material container.

FIG. 6 is a plan view of the container body constituent sheet material 3 in which the first film layer 1 and the second film layer 2 are stacked, and the container body constituent sheet material 3 is viewed from the second film layer side.

The sheet material container 5 can be obtained by bending the container body constituent sheet material 3 and joining the peripheral edge portion 3a in a state where the inner container constituent sheet material 71 (not illustrated in FIG. 6) is overlaid on the container body constituent sheet material 3 illustrated in FIG. 6. After the enclosing portion 51 (the non-joint portion 31 of the container body constituent sheet material 3) of the sheet material container 5 is filled with the filler such as air from an introduction port 34, for example, the introduction port 34 is sealed, whereby the container body 6 (the sheet material container 5) as illustrated in FIGS. 1 to 3 in which the filler is filled in the enclosing portion 51 and which is in a self-supporting state is configured. The peripheral edge portion 3a is joined by, for example, heat sealing. The first film layer 1 constitutes an outer surface of the container body 6. The second film layer 2 is stacked inside the first film layer 1.

The heat sealing includes heat sealing using a heated heat seal bar or a heated roll, and heat sealing using ultrasonic sealing, high frequency sealing, or the like, and refers to all types of heat sealing regardless of the means.

Figures 7A, 7B:
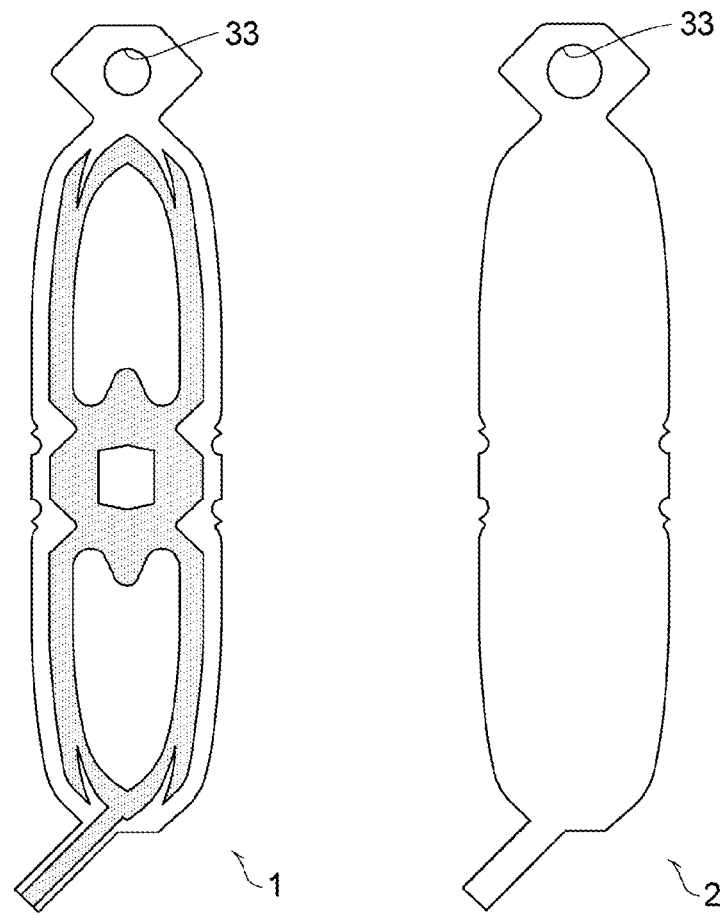
FIG. 7A is a plan view of a first film layer.
FIG. 7B is a plan view of a second film layer.

FIG. 7A is a plan view of the first film layer 1 constituting the container body constituent sheet material 3, and FIG. 7B is a plan view of the second film layer 2 constituting the container body constituent sheet material 3.

With reference to FIGS. 6 and 7, the second film layer 2 is overlaid on the first film layer 1, and an interlayer between the first film layer 1 and the second film layer 2 is joined except for the non-joint portion 31. The portion at which the interlayer between the first film layer 1 and the second film layer 2 is joined is the joint portion 32.

The first film layer 1 and the second film layer 2 are, for example, substantially the same in shape and size in a plan view. A hole portion 33 penetrating the first film layer 1 and the second film layer 2 is formed in a portion of the container body constituent sheet material 3 that forms the top gusset portion 6d. The spout 61 is inserted into the hole portion 33. In FIG. 6, the spout 61 is illustrated by an alternate long and short dash line, which is a virtual line.

For example, at least one or both of the first film layer 1 and the second film layer 2 is partially subjected to non-joint processing so that the interlayer between the first film layer 1 and the second film layer 2 is partially not joined to form the non-joint portion 31 as illustrated in FIG. 6. For example, an inner surface of the first film layer 1 is subjected to the non-joint processing. In FIG. 7, the portion subjected to the non-joint processing is indicated by innumerable dots.

When the inner surface of the first film layer 1 subjected to the non-joint processing described above and an outer surface of the second film layer 2 are overlaid on one another and the interlayer between the first film layer 1 and the second film layer 2 is joined, the first film layer 1 and the second film layer 2 are not joined at the portion subjected to the non-joint processing, and the first film layer 1 and the second film layer 2 are joined at a portion other than the portion subjected to the non-joint processing. The first film layer 1 and the second film layer 2 may be joined via an adhesive, or by heat-sealing an innermost layer of the first film layer 1 and an outermost layer of the second film layer 2. Preferably, the innermost layer of the first film layer 1 and the outermost layer of the second film layer 2 are heat-sealed to form the joint portion 32 between the first film layer 1 and the second film layer 2.

In this way, the container body constituent sheet material 3 as illustrated in FIG. 6 in which the joint portion 32 is formed so as to surround the non-joint portion 31 is obtained.

[Sheet Material Having First Film Layer and Second Film Layer]

Next, the sheet material having the first film layer and the second film layer, which is a feature of the present invention, will be described in detail.

The first film layer has a multilayer film including two or more resin layers. Hereinafter, an innermost layer of the resin layers constituting the first film layer is referred to as the "first innermost layer", and an outermost layer of the resin layers constituting the first film layer is referred to as the "first outermost layer".

Since the first film layer is a film layer constituting the outer surface of the container body, the inner surface of the first film layer (inner surface of the first innermost layer) faces the enclosing portion (non-joint portion).

Since the first innermost layer can be joined to the second film layer by heat sealing, the first innermost layer is formed of a polyolefin resin layer. The polyolefin resin layer is formed of a polyolefin having heat sealability. The heat sealability refers to a property of being able to join by heat sealing. As the polyolefin resin layer having heat sealability, it is preferable to use a polyolefin resin layer without stretching treatment.

The first film layer has an extruded multilayer structural part having a polyolefin resin layer/an ethylene-vinyl alcohol copolymer resin layer. The polyolefin resin layer of the extruded multilayer structural part constitutes the first innermost layer. When the container body constituent sheet material is formed, the first film layer is overlaid on the second film layer so that the polyolefin resin layer (first innermost layer) becomes the side facing the non-joint portion. The non-joint portion is formed between the film layers, and the filler can be enclosed between the film layers in the non-joint portion. Therefore, in the film layer, the non-joint portion and the enclosing portion can be substantially identified.

Here, in the present specification, the extruded multilayer structural part refers to a multilayer film structure which has two or more resin layers and in which at least one of the resin layers is stacked on the other resin layer by an extrusion molding method. In other words, the extruded multilayer structural part refers to a multilayer film structure which has two or more resin layers and in which at least one of the resin layers has a solidified layer of a melt-extruded resin and the resin layer having the solidified layer of the melt-extruded resin is stacked on and bonded to the other resin layer. From the viewpoint of stretching and non-stretching, the extruded multilayer structural part includes a case where at least one resin layer without stretching treatment and at least one resin layer subjected to stretching treatment are stacked and bonded, or a case where only two or more resin layers without stretching treatment are stacked and bonded. Although the stretching treatment may be either uniaxial stretching (stretching in an MD direction or a TD direction) or biaxial stretching (stretching in both the MD direction and the TD direction), the stretching treatment is preferably the biaxial stretching.

A coextruded multilayer structural part is conceptually included in the extruded multilayer structural part. The coextruded multilayer structural part refers to a multilayer film structure which has two or more resin layers and in which all the resin layers are stacked by an extrusion molding method (co-extrusion molding method). In the film layer formed by the extrusion molding method, adjacent resin layers are stacked on and bonded to each other. In other words, the coextruded multilayer structural part refers to a coextruded film which has two or more resin layers and in which all the resin layers are each independently having a solidified layer of a melt-extruded resin and in which each resin layer having the solidified layer of the melt-extruded resin is stacked and bonded. From the viewpoint of stretching and non-stretching, the coextruded film preferably has only two or more resin layers without stretching treatment.

The extruded multilayer structural part of the first film layer has a two-layer structure of a polyolefin resin layer (first innermost layer)/an ethylene-vinyl alcohol copolymer resin layer in order from the side facing the enclosing portion. Hereinafter, the extruded multilayer structural part of the first film layer is referred to as the "first extruded multilayer structural part".

An interlayer between the polyolefin resin layer and the ethylene-vinyl alcohol copolymer resin layer may be directly stacked and bonded, or the polyolefin resin layer and the ethylene-vinyl alcohol copolymer resin layer may be stacked and bonded with an adhesive resin layer such as adhesive polyolefin interposed therebetween. By interposing such an adhesive resin layer, dissimilar materials can be firmly multi-layered by extrusion molding. The adhesive resin layer is interposed between layers by extrusion molding.

The first extruded multilayer structural part may have three or more layers, provided that it has the two-layer structure.

Examples of the first extruded structural part include <1A> a structure of two kinds of two layers of a polyolefin resin layer (first innermost layer)/an ethylene-vinyl alcohol copolymer resin layer in order from the side facing the enclosing portion, <1B> a structure of two kinds of three layers of a polyolefin resin layer (first innermost layer)/an ethylene-vinyl alcohol copolymer resin layer/a polyolefin resin layer in order from the side facing the enclosing portion, <1C> a structure of three kinds of four layers of a polyolefin resin layer (first innermost layer)/an ethylene-vinyl alcohol copolymer resin layer/a polyolefin resin layer/a polyester resin layer in order from the side facing the enclosing portion, and <1D> a structure of three kinds of three layers of polyolefin resin layer (first innermost layer)/an ethylene-vinyl alcohol copolymer resin layer/a polyester resin layer in order from the side facing the enclosing portion. Even in the multilayer structures <1A> to <1D>, the adhesive resin layer described above may be interposed between the polyolefin resin layer and the ethylene-vinyl alcohol copolymer resin layer, between the polyolefin resin layer and the polyester resin layer, or/and between the ethylene-vinyl alcohol copolymer resin layer and the polyester resin layer.

In these examples of <1A> to <1D>, in each first extruded multilayer structural part, each independently, at least one resin layer may be stacked on another resin layer by extrusion molding, and preferably, all the resin layers (including the adhesive resin layer when the adhesive resin layer is provided) are stacked by coextrusion molding. It is preferable that all the resin layers stacked by the coextrusion molding are not subjected to stretching treatment.

Among <1A> to <1D> above, the first extruded multilayer structural part is preferably <1A> or <1 B>. In addition, the first extruded multilayer structural part of <1A> is preferably a coextruded film in which the polyolefin resin layer and the ethylene-vinyl alcohol copolymer resin layer are each extruded and more preferably a coextruded film in which the polyolefin resin layer, the adhesive resin layer, and the ethylene-vinyl alcohol copolymer resin layer are each extruded.

The first extruded multilayer structural part of <1B> may be a film in which the polyolefin resin layer is extrusion molded onto a coextruded film in which the polyolefin resin layer and the ethylene-vinyl alcohol copolymer resin layer are each extruded or a coextruded film in which the polyolefin resin layer, the ethylene-vinyl alcohol copolymer resin layer, and the polyolefin resin layer are each extrusion molded. The first extruded multilayer structural part of <1B> is preferably a coextruded film in which the polyolefin resin layer, the ethylene-vinyl alcohol copolymer resin layer, and the polyolefin resin layer are each extruded, and more preferably a coextruded film in which the polyolefin resin layer, the adhesive resin layer, the ethylene-vinyl alcohol copolymer resin layer, the adhesive resin layer, and the polyolefin resin layer are each extruded.

The first film layer is a resin layer further constituting the first outermost layer (the outermost layer of the first film layer) on the outside of the first extruded multilayer structural part, and it is preferable that a resin layer having heat resistance is stacked. Examples of the heat-resistant resin layer include a polyester resin layer, a nylon resin layer, and a stretched polyolefin resin layer. The polyester resin layer or the stretched polyolefin resin layer is preferably used, and a biaxially stretched polyethylene terephthalate film or a biaxially stretched polyolefin film is more preferably used. Since the stretched polyolefin resin layer such as the stretched polyethylene resin layer is crystallized by orientation, the stretched polyolefin resin layer has heat resistance that can withstand heating during heat sealing as compared with the polyolefin resin layer without stretching treatment.

A preferred example of the stretched polyolefin resin layer is a stretched polyethylene resin layer. When the stretched polyethylene resin layer is used as the first outermost layer, examples of polyethylene include high-density polyethylene, medium-density polyethylene, low-density polyethylene, and linear low-density polyethylene. Although the stretched polyethylene resin layer may be uniaxially stretched or biaxially stretched, from the viewpoint of strength, biaxially stretched one is preferable. As a stretching method, sequential biaxial stretching or simultaneous biaxial stretching can be applied, and after appropriately heating by roll heating, infrared heating, or the other means, stretching can be performed in a desired stretching direction (MD direction, TD direction). A stretch ratio is preferably 200% or more and 800% or less, and more preferably 300% or more and 600% or less. By setting a stretch ratio within this range, uneven thickness of the resin layer is unlikely to occur, and breakage during film formation can be prevented.

The heat-resistant resin layer constituting the first outermost layer may be a single layer or may have a multilayer structure of two or more layers. In the case of two layers, a resin layer in which a biaxially stretched polyethylene terephthalate film and a biaxially stretched nylon film are stacked may be used.

The heat-resistant resin layer may be one in which an inorganic vapor deposition film such as a metal vapor deposition film or a silica vapor deposition film is stacked. As the heat-resistant resin layer, a polyester resin layer on which a silica vapor deposition film is stacked (a polyethylene terephthalate film on which the silica vapor deposition film is stacked, preferably a biaxially stretched polyethylene terephthalate film on which the silica vapor deposition film is stacked) is preferably used. When a biaxially stretched polyethylene terephthalate film and/or a biaxially stretched nylon film is used as an outermost resin layer, the films are usually stacked via an adhesive, as will be described later.

The heat-resistant resin layer may be stacked on an outer surface of the first extruded multilayer structural part via an adhesive, or may be stacked on the outer surface of the first extruded multilayer structural part by extrusion molding. When the heat-resistant resin layer is stacked via an adhesive, an adhesive for lamination, which will be described later, is usually used. When the heat-resistant resin layer is stacked on the outer surface of the first extruded multilayer structural part by extrusion molding, the heat-resistant resin layer and the outer surface of the first extruded multilayer structural part are directly stacked and bonded, or may be stacked via a binder-like resin layer. For example, when the heat-resistant resin layer is a polyester resin layer, adhesiveness to the polyolefin resin layer of the first extruded multilayer structural part may be poor. In such a case, it is preferable that a resin layer serving as a binder (for example, a polyethylene resin layer) is melt-extruded between the polyester resin layer and the polyolefin resin layer of the first extruded multilayer structural part to form the first film layer having a polyester resin layer/an extruded binder resin layer/a first extruded multilayer structural part.

A design print layer is provided on the first film layer constituting the outer surface of the container body, if necessary. The design print layer may be provided so that the design can be seen from the outside of the container body. For example, the design print layer is provided on the outer surface or/and inner surface of the first outermost layer (for example, the resin layer having heat resistance). From the viewpoint of scratch prevention, the design print layer is preferably provided on the inner surface of the first outermost layer. When the design print layer is provided on the inner surface of the first outermost layer, a transparent first outermost layer is used.

The design print layer is provided by printing a known color ink on the first outermost layer or the like.

FIG. 8 illustrates some examples of a layer configuration of the first film layer.

Figure 8A:
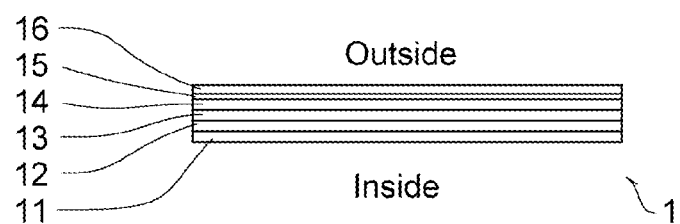
FIG. 8 is a reference view illustrating a layer configuration of the first film layer.

The first film layer 1 in FIG. 8A has a layer configuration of a polyolefin resin layer 11 (first innermost layer)/an adhesive resin layer/an ethylene-vinyl alcohol copolymer resin layer 12/an adhesive resin layer/a polyolefin resin layer 13/an adhesive layer 14/a design print layer 15/a polyester resin layer 16 (first outermost layer) in order from the side (inside) facing the enclosing portion. In FIGS. 8 to 10, the adhesive resin layer is not illustrated.

Figure 8B:
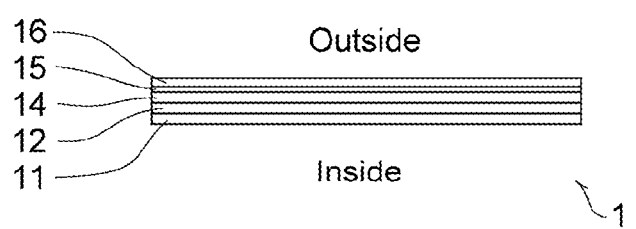

The first film layer in FIG. 8B has a layer configuration of the polyolefin resin layer 11 (first innermost layer)/an adhesive resin layer/the ethylene-vinyl alcohol copolymer resin layer 12/the adhesive layer 14/the design print layer 15/the polyester resin layer 16 (first outermost layer) in order from the side (inside) facing the enclosing portion.

In the first extruded multilayer structural part having the polyolefin resin layer 11/an adhesive resin layer/the ethylene-vinyl alcohol copolymer resin layer 12/an adhesive resin layer/the polyolefin resin layer 13 in FIG. 8A, at least one resin layer is stacked by extrusion molding. For example, after an ethylene-vinyl alcohol copolymer film (ethylene-vinyl alcohol copolymer resin layer) is prepared, an adhesive resin and polyolefin are melt-extruded from both sides of the film to be formed in a film shape, whereby the first extruded multilayer structural part is obtained.

In the first extruded multilayer structural part having the polyolefin resin layer 11/an adhesive resin layer/the ethylene-vinyl alcohol copolymer resin layer 12 in FIG. 8B, at least one resin layer is stacked by extrusion molding. For example, after an ethylene-vinyl alcohol copolymer film (ethylene-vinyl alcohol copolymer resin layer) is prepared, an adhesive resin and polyolefin are melt-extruded from one side of the film to be formed in a film shape, whereby the first extruded multilayer structural part is obtained.

Each of the first extruded multilayer structural parts of FIGS. 8A and 8B is preferably formed by coextrusion molding. For example, the first extruded multilayer structural part of FIG. 8A is obtained by melt-extruding the polyolefin, adhesive resin, ethylene-vinyl alcohol copolymer, adhesive resin and polyolefin and forming them in a film shape.

A thickness of the polyolefin resin layers 11 and 13 of the first extruded multilayer structural part is not limited to a particular thickness, and is, for example, 10 µm to 150 µm. In particular, since the polyolefin resin layer 11 constituting the innermost layer of the first film layer 1 is a layer to be heat-sealed, the polyolefin resin layer 11 is preferably relatively thick. For example, the thickness of the polyolefin resin layer 11 constituting the first innermost layer is 20 µm to 150 µm.

A thickness of the ethylene-vinyl alcohol copolymer resin layer 12 of the first film layer 1 is not limited to a particular thickness, and is, for example, 4 µm to 40 µm.

A thickness of the adhesive resin layer of the first film layer 1 is not limited to a particular thickness, and is, for example, 3 µm to 10 µm.

In FIG. 8, the adhesive layer 14 is formed using an adhesive for lamination. Examples of the adhesive for lamination include a dry laminating adhesive, a solvent-free laminating adhesive, and a wet laminating adhesive. The dry laminating adhesive is a solvent-volatile type adhesive containing an organic solvent. The solvent-free laminating adhesive is an adhesive that does not contain an organic solvent and does not require a drying step. The wet laminating adhesive is a dry type adhesive containing an aqueous solvent.

A thickness of the adhesive layer 14 is not limited to a particular thickness, and is, for example, 2 µm to 30 µm.

In FIG. 8, a thickness of the polyester resin layer 16 is not limited to a particular thickness, and is, for example, 8 µm to 40 µm.

The first film layer 1 of FIG. 8 is obtained by applying the adhesive for lamination onto at least one of the first extruded multilayer structural part (extruded multilayer film, preferably coextruded multilayer film) and a polyester resin layer (biaxially stretched polyethylene terephthalate film) and bonding the first extruded multilayer structural part and the polyester resin layer together.

In FIG. 8, the polyester resin layer 16 and the first extruded multilayer structural part are stacked and bonded using the adhesive layer 14. However, instead of the adhesive layer 14, the resin layer serving as a binder (for example, a polyethylene resin layer) may be stacked between the polyester resin layer and the first extruded multilayer structural part to form the first film layer having a polyester resin layer/an extruded binder resin layer/a first extruded multilayer structural part.

The second film layer has a multilayer film including two or more resin layers. Hereinafter, an outermost layer of the resin layers constituting the second film layer is referred to as the "second outermost layer", and an innermost layer of the resin layers constituting the second film layer is referred to as the "second innermost layer".

Since the second film layer is stacked inside the first film layer, the outer surface of the second film layer (outer surface of the second outermost layer) faces the enclosing portion.

Since the second outermost layer can be joined to the first film layer by heat sealing, the second outermost layer is preferably formed of a polyolefin resin layer. The polyolefin resin layer is formed of a polyolefin having heat sealability. The polyolefin resin layer having heat sealability is preferably a polyolefin resin layer without stretching treatment.

In order to impart gas barrier properties to the second film layer, the second film layer preferably contains an ethylene-vinyl alcohol copolymer resin layer.

A layer configuration of the preferred second film layer is not limited to a particular layer configuration, provided that the second film layer has a polyolefin resin layer as the second outermost layer and an ethylene-vinyl alcohol copolymer resin layer as a layer other than the second outermost layer.

For example, the second film layer may have a two-layer structure consisting of only the polyolefin resin layer and the ethylene-vinyl alcohol copolymer resin layer, or may have a multilayer structure having a resin layer in addition to the two layers.

Examples of the resin layer other than the two layers include another polyolefin resin layer, another polyester resin layer, another nylon resin layer, and the like, which are different from the two layers.

The second film layer may include an extruded multilayer structural part, or all the resin layers may be stacked and bonded via an adhesive.

The second film layer preferably has an extruded multilayer structural part including a polyolefin resin layer (second outermost layer)/an ethylene-vinyl alcohol copolymer resin layer. Hereinafter, the extruded multilayer structural part of the second film layer is referred to as the "second extruded multilayer structural part".

An interlayer between the polyolefin resin layer and the ethylene-vinyl alcohol copolymer resin layer may be directly stacked and bonded, or the polyolefin resin layer and the ethylene-vinyl alcohol copolymer resin layer may be stacked and bonded with an adhesive resin layer such as adhesive polyolefin interposed therebetween. By interposing such an adhesive resin layer, dissimilar materials can be firmly multi-layered by extrusion molding. The adhesive resin layer is interposed between layers by extrusion molding.

The second extruded multilayer structural part may have three or more layers, provided that it has the two-layer structure.

Examples of the second extruded multilayer structural part include <2A> a structure of two kinds of two layers of a polyolefin resin layer (second outermost layer)/an ethylene-vinyl alcohol copolymer resin layer in order from the side facing the enclosing portion, <2B> a structure of two kinds of three layers of a polyolefin resin layer (second outermost layer)/an ethylene-vinyl alcohol copolymer resin layer/a polyolefin resin layer in order from the side facing the enclosing portion, <2C> a structure of three kinds of four layers of polyolefin resin layer (second outermost layer)/an ethylene-vinyl alcohol copolymer resin layer/a polyolefin resin layer/a polyester resin layer in order from the side facing the enclosing portion, and <2D> a structure of three kinds of five layers of a polyolefin resin layer (second outermost layer)/a nylon resin layer/an ethylene-vinyl alcohol copolymer resin layer/a nylon resin layer/a polyolefin resin layer in order from the side facing the enclosing portion. Even in the multilayer structures <2A> to <2D>, the adhesive resin layer described above may be interposed between the polyolefin resin layer and the ethylene-vinyl alcohol copolymer resin layer, between the polyolefin resin layer and the polyester resin layer, between the polyolefin resin layer and the nylon resin layer, between the nylon resin layer and the ethylene-vinyl alcohol copolymer resin layer, or/and between the nylon resin layer and the polyolefin resin layer.

In these examples of <2A> to <2D>, in each second extruded multilayer structural part, each independently, at least one resin layer may be stacked on another resin layer by extrusion molding, and preferably, all the resin layers are stacked by coextrusion molding. It is preferable that all the resin layers stacked by the coextrusion molding are not subjected to stretching treatment.

Among <2A> to <2D> above, the second extruded multilayer structural part is preferably <2A> or <2B>. In addition, the second extruded multilayer structural part of <2A> is preferably a coextruded film in which the polyolefin resin layer and the ethylene-vinyl alcohol copolymer resin layer are each extrusion molded and more preferably a coextruded film in which the polyolefin resin layer, the adhesive resin layer, and the ethylene-vinyl alcohol copolymer resin layer are each extrusion molded. The second extruded multilayer structural part of <2B> is preferably a coextruded film in which the polyolefin resin layer, the ethylene-vinyl alcohol copolymer resin layer, and the polyolefin resin layer are each extrusion molded, and more preferably a coextruded film in which the polyolefin resin layer, the adhesive resin layer, the ethylene-vinyl alcohol copolymer resin layer, the adhesive resin layer, and the polyolefin resin layer are each extrusion molded.

The second film layer is a resin layer further constituting the second innermost layer (the innermost layer of the second film layer) on the inside of the second extruded multilayer structural part, and the resin layer having heat resistance may be stacked. As the resin layer having excellent heat resistance, those as exemplified in the heat-resistant resin layer of the first film layer are used, and examples thereof include a polyester resin layer, a nylon resin layer, and a stretched polyolefin resin layer. The polyester resin layer or the stretched polyolefin resin layer is preferably used, and the biaxially stretched polyethylene terephthalate film or the biaxially stretched polyolefin film is more preferably used.

The heat-resistant resin layer constituting the second innermost layer may be a single layer or may have a multilayer structure of two or more layers. The heat-resistant resin layer may be one in which an inorganic vapor deposition film such as a metal vapor deposition film or a silica vapor deposition film is provided.

The heat-resistant resin layer may be stacked on an inner surface of the second extruded multilayer structural part via an adhesive, or may be stacked on the inner surface of the second extruded multilayer structural part by extrusion molding. When the heat-resistant resin layer is stacked by extrusion molding, similarly to the first film layer, coextrusion molding may be performed at the same time as the binder-like resin layer (for example, a polyethylene resin layer).

FIG. 9 illustrates some examples of a layer configuration of the second film layer.

Figure 9A:
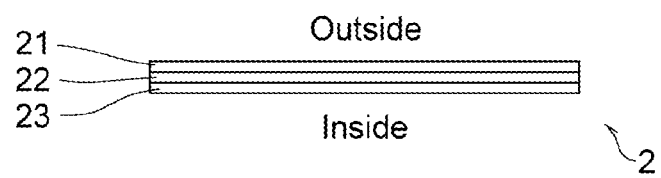
FIG. 9 is a reference view illustrating a layer configuration of the second film layer.
Figure 10:
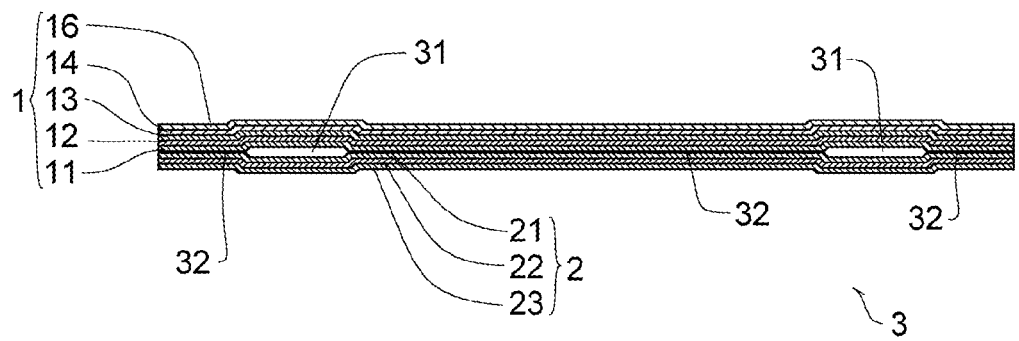
FIG. 10 is an enlarged end view taken along the line X-X of FIG. 6.

The second film layer 2 of FIG. 9A has a layer configuration of a polyolefin resin layer 21 (second outermost layer)/an adhesive resin layer/an ethylene-vinyl alcohol copolymer resin layer 22/an adhesive resin layer/a polyolefin resin layer 23 (second innermost layer) in order from the side (outside) facing the enclosing portion.

Figure 9B:
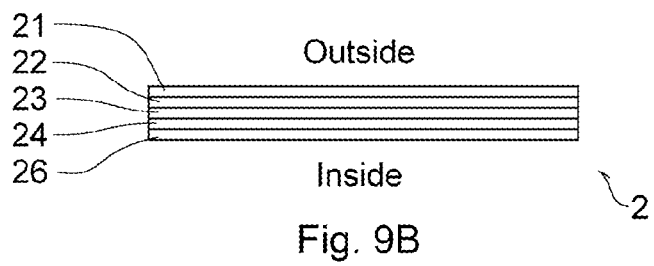

The second film layer 2 of FIG. 9B has a layer configuration of the polyolefin resin layer 21 (second outermost layer)/an adhesive resin layer/the ethylene-vinyl alcohol copolymer resin layer 22/an adhesive resin layer/the polyolefin resin layer 23/an adhesive layer 24/a polyester resin layer 26 (second innermost layer) in order from the side (outside) facing the enclosing portion.

Figure 9C:
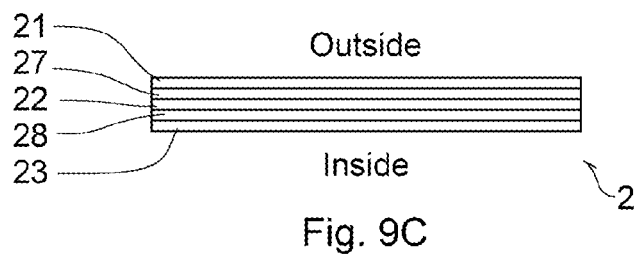

The second film layer 2 of FIG. 9C has a layer configuration of the polyolefin resin layer 21 (second outermost layer)/an adhesive resin layer/a nylon resin layer 27/an adhesive resin layer/the ethylene-vinyl alcohol copolymer resin layer 22/an adhesive resin layer/a nylon resin layer 28/an adhesive resin layer/the polyolefin resin layer 23 (second innermost layer) in order from the side (outside) facing the enclosing portion.

In the second extruded multilayer structural part having the polyolefin resin layer 21/the ethylene-vinyl alcohol copolymer resin layer 22/the polyolefin resin layer 23 of FIGS. 9A and 9B, at least one resin layer is stacked by extrusion molding, and preferably, all the resin layers are stacked by coextrusion molding.

In the second film layer 2 of FIG. 9C, for example, at least one resin layer is stacked by extrusion molding, and preferably all the resin layers are stacked by coextrusion molding.

A thickness of the polyolefin resin layers 21 and 23 of the second film layer 2 is not limited to a particular thickness, and is, for example, 10 μm to 150 μm. In particular, since the polyolefin resin layer 21 constituting the outermost layer of the second film layer 2 is a layer to be heat-sealed, the polyolefin resin layer 21 is preferably relatively thick. For example, the thickness of the polyolefin resin layer 21 constituting the second outermost layer is 20 μm to 150 μm.

A thickness of the ethylene-vinyl alcohol copolymer resin layer 22 of the second film layer 2 is not limited to a particular thickness, and is, for example, 4 μm to 40 μm.

A thickness of the polyester resin layer 26 of the second film layer 2 is not limited to a particular thickness, and is, for example, 8 μm to 40 μm.

A thickness of the nylon resin layers 27 and 28 of the second film layer 2 is not limited to a particular thickness, and is, for example, 8 μm to 40 μm.

A thickness of the adhesive resin layer of the second film layer 2 is not limited to a particular thickness, and is, for example, 3 μm to 10 μm.

In FIG. 9, the adhesive layer 24 is formed using an adhesive for lamination similarly to the first film layer. A thickness of the adhesive layer 24 is not limited to a particular thickness, and is, for example, 2 μm to 30 μm.

A design print layer (not illustrated) may be provided on the second film layer, if necessary. When the design print layer is provided on the second film layer, it is preferable to provide the design print layer so that the design can be seen from the outside of the container body.

When the design print layer is provided on the second film layer, the design print layer is provided on the outer surface or/and inner surface of the second innermost layer, or is provided on the outer surface or/and inner surface of the resin layer other than the second innermost layer.

The polyolefin resin layer of the first film layer and the second film layer is formed of a polyolefin having heat sealability.

As the polyolefin having heat sealability, general-purpose polyethylene or polypropylene can be used, preferably low-density polyethylene can be used, and more preferably linear low-density polyethylene can be used.

The linear low-density polyethylene is a polymer containing at least a structural unit derived from ethylene as a repeating unit. The linear low-density polyethylene contains a short-chain branched structure and is generally a low-density polyethylene obtained by copolymerizing ethylene with an α-olefin at medium or low pressure. A density of the linear low-density polyethylene is, for example, about 0.850 to 0.945 g/cm$^3$, and preferably about 0.910 to 0.925 g/cm$^3$.

The ethylene-vinyl alcohol copolymer resin layer of the first film layer and the second film layer has an ethylene-vinyl alcohol copolymer. The ethylene-vinyl alcohol copolymer has high gas barrier properties. The ethylene-vinyl alcohol copolymer is a polymer compound obtained by saponifying an ethylene-vinyl acetate-based copolymer (copolymer containing ethylene and vinyl acetate as essential monomer components). An ethylene component content of the ethylene-vinyl alcohol-based copolymer is preferably 20 to 60% by weight based on a total amount of the monomer components. A degree of saponification of a vinyl acetate component is preferably 95 mol % or more from the viewpoint of gas barrier properties.

The polyester resin layer of the first film layer and the second film layer has polyester. As the polyester, polyethylene terephthalate (PET) type, poly(ethylene-2,6-naphthalene dicarboxylate) (PEN) type, and the like can be used, and polyethylene terephthalate (PET) type can be preferably used.

The nylon resin layer of the first film layer and the second film layer has polyamide. As the polyamide, polyamide-6, polyamide-12, polyamide-66, polyamide-610, polyamide-11, and the like can be used.

In the container body 6 (sheet material container 5) formed from the sheet material 3 having the first film layer 1 and the second film layer 2, the enclosing portion is required not to break when the container body 6 is dropped. In this regard, in order to enhance impact resistance of the sheet material container 5 due to dropping, it is preferable that tensile elongation in the MD direction (corresponding to the width direction of the sheet material container 5 with respect to the self-supporting state of the sheet material container 5) of at least one of the first film layer 1 and the second film layer 2 is kept high, and it is more preferable that the tensile elongations in the MD direction of both the first film layer 1 and the second film layer 2 are kept high. From the viewpoint of enhancing the impact resistance due to dropping, the tensile elongation in the MD direction of the extruded multilayer structural part of each of the first film layer 1 and the second film layer 2 is preferably each independently, for example, 300% or more, from the viewpoint of further enhancing the impact resistance, the tensile elongation is more preferably 400% or more, and from the viewpoint of still further enhancing the impact resistance, the tensile elongation is further preferably 500% or more. It is preferable that the tensile elongation in the TD direction (corresponding to the height direction of the sheet material container 5 with respect to the self-supporting state of the sheet material container 5) of at least one of the first film layer 1 and the second film layer 2 is also kept high, and it is more preferable that the tensile elongations in the TD direction of both the first film layer 1 and the second film layer 2 are kept high. From the viewpoint of enhancing the impact resistance due to dropping, the tensile elongation in the TD direction of the extruded multilayer structural part of each of the first film layer 1 and the second film layer 2 is preferably each independently, for example, 300% or more, from the viewpoint of further enhancing the impact resistance, the tensile elongation is more preferably 400% or more, and from the viewpoint of still further enhancing the impact resistance, the tensile elongation is further preferably 500% or more. Although there is no particular preferable upper limit of each tensile elongation, in a realistic value, the upper limit of the tensile elongation in each MD and TD direction is 900% or less, further 800% or less, and 700% or less.

The tensile elongation refers to an elongation until a pulled sample breaks, and when a sample length before a test is L0 and the sample length during breaking is L, calculation is performed according to tensile elongation (%)=100×(L−L0)/L0. For a specific method for measuring the tensile elongation, reference is made to that described in Examples.

FIG. 10 is an enlarged end view of the container body constituent sheet material 3 having the first film layer 1 and the second film layer 2 having a preferable layer configuration from the above-exemplified examples. Furthermore, FIG. 10 is an end view obtained by cutting a portion along the line X-X of FIG. 6.

In FIG. 10, the first film layer 1 has the polyolefin resin layer 11/an adhesive resin layer/the ethylene-vinyl alcohol copolymer resin layer 12/an adhesive resin layer/the polyolefin resin layer 13/the adhesive layer 14/a design print layer/the polyester resin layer 16 in order from the side (inside) facing the non-joint portion 31 or the enclosing portion 51. The second film layer 2 has the polyolefin resin layer 21/an adhesive resin layer/the ethylene-vinyl alcohol copolymer resin layer 22/an adhesive resin layer/the polyolefin resin layer 23 in order from the side (outside) facing the non-joint portion 31 or the enclosing portion 51.

In FIG. 10, the adhesive resin layer and the design print layer are not illustrated.

<Inner Container Constituent Sheet Material>

Figure 11:
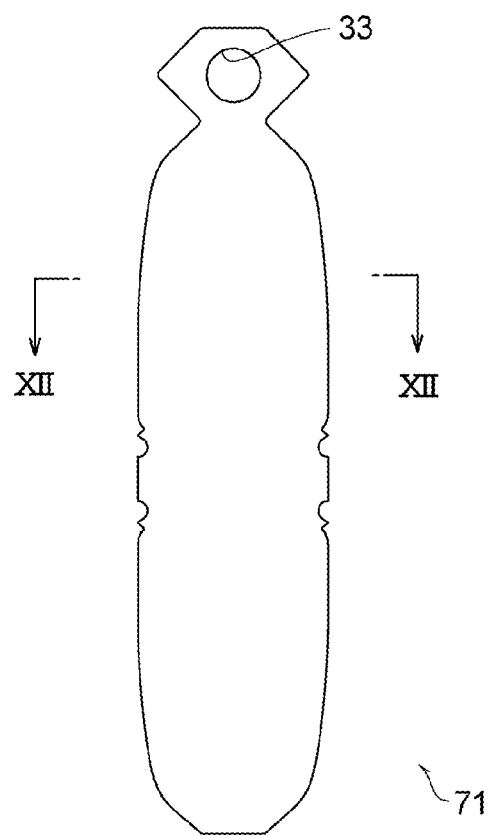
FIG. 11 is a plan view of the sheet material constituting an inner container of the sheet material container.

FIG. 11 is a plan view of the sheet material 71 (inner container constituent sheet material 71) constituting the inner container 7.

The inner container constituent sheet material 71 is used so as to be overlaid on the inside of the container body constituent sheet material 3 (the innermost layer side of the second film layer 2).

Also in the inner container constituent sheet material 71, the hole portion 33 is formed in the portion forming the top gusset portion 6d.

Although the inner container constituent sheet material 71 is not limited to a particular material, it is preferable to use a multilayer film having a polyolefin resin layer having heat sealability on both sides, and in addition, it is more preferable to use a multilayer film having a polyolefin resin layer having heat sealability on both sides and including a layer having gas barrier properties. The polyolefin resin layer having heat sealability is preferably a polyolefin resin layer without stretching treatment. For example, the inner container constituent sheet material 71 has a multilayer film having at least two kinds selected from a polyolefin resin layer, an ethylene-vinyl alcohol copolymer resin layer, and a nylon resin layer.

The multilayer film constituting the inner container constituent sheet material 71 may be a multilayer film (coextruded film) in which all the resin layers are formed by the extrusion molding method, a multilayer film in which two or more resin layers are formed by the extrusion molding method and some layers are stacked and bonded via an adhesive layer, or a multilayer film in which all layers are stacked and bonded via the adhesive layer.

Examples of a preferable layer configuration of the inner container constituent sheet material 71 include <7A> a polyolefin resin layer having heat sealability/an adhesive resin layer/an ethylene-vinyl alcohol copolymer resin layer/an adhesive resin layer/a polyolefin resin layer having heat sealability, <7B> a polyolefin resin layer having heat sealability/an adhesive layer/a polyester resin layer with an inorganic vapor deposition film/an adhesive layer/a polyolefin resin layer having heat sealability, <7C> a polyolefin resin layer having heat sealability/an adhesive layer/nylon resin layer with an inorganic vapor deposition film/an adhesive layer/a polyolefin resin layer having heat sealability, <7D> a polyolefin resin layer having heat seal ability/an adhesive layer or an adhesive resin layer/a nylon resin layer/an adhesive layer/a polyester resin layer with an inorganic vapor deposition film/an adhesive layer/a nylon resin layer/an adhesive layer or an adhesive resin layer/a polyolefin resin layer having heat sealability, <7E> a polyolefin resin layer having heat sealability/an adhesive layer or an adhesive resin layer/a nylon resin layer/an adhesive layer/a polyester resin layer with an inorganic vapor deposition film/an adhesive layer/a polyolefin resin layer having heat sealability, <7F> a polyolefin resin layer having heat sealability/an adhesive layer/a polyester resin layer with an inorganic vapor deposition film/an adhesive layer/a nylon resin layer/an adhesive layer or an adhesive resin layer/a polyolefin resin layer having heat sealability, <7G> a polyolefin resin layer having heat sealability/an adhesive layer or an adhesive resin layer/a nylon resin layer/an adhesive layer/an aluminum foil/an adhesive layer/a polyolefin resin layer having heat sealability, and <7H> a polyolefin resin layer having heat sealability/an adhesive layer or an adhesive resin layer/a nylon resin layer/an adhesive layer/an aluminum foil/an adhesive layer/a nylon resin layer/an adhesive layer or an adhesive resin layer/a polyolefin resin layer having heat sealability, in order from the side facing the container body constituent sheet material 3.

As the preferable layer configuration of the inner container constituent sheet material 71, <7F> a polyolefin resin layer having heat sealability/an adhesive layer/a polyester resin layer with an inorganic vapor deposition film/an adhesive layer/a nylon resin layer/an adhesive layer/a polyolefin resin layer having heat sealability is used.

As the inorganic vapor deposition film, a metal vapor deposition film such as aluminum, a silica vapor deposition film, or the like can be used.

Figure 12A:
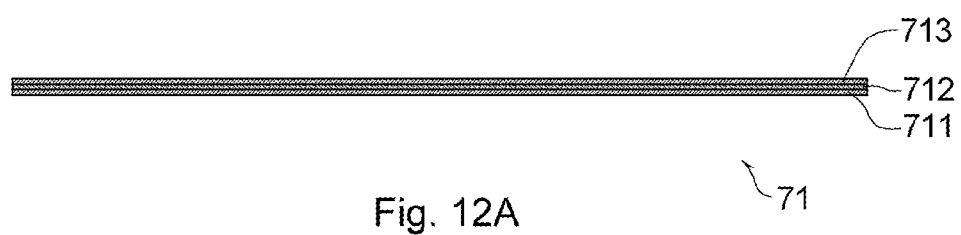
FIG. 12 is an enlarged end view taken along the line XII-XII of FIG. 11.
Figure 12B:
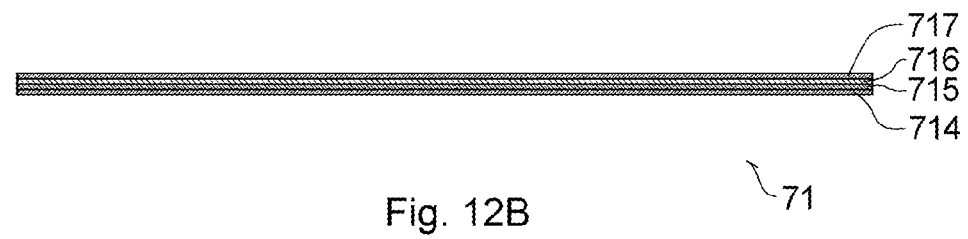

FIG. 12A is an enlarged end view of the inner container constituent sheet material 71 having one layer configuration in the above-exemplified examples, and FIG. 12B is an enlarged end view of the inner container constituent sheet material 71 having the other layer configuration in the above-exemplified examples. FIG. 12 is an end view obtained by cutting a portion along the line XII-XII of FIG. 11.

In FIG. 12A, the inner container constituent sheet material 71 has a polyolefin resin layer 711/an adhesive layer/a polyester resin layer 712 with an inorganic vapor deposition film/an adhesive layer/a polyolefin resin layer 713 in order from the side facing the container body constituent sheet material 3 (in order from the outside).

In FIG. 12B, the inner container constituent sheet material 71 has a polyolefin resin layer 714/an adhesive layer/a polyester resin layer 715 with an inorganic vapor deposition film/an adhesive layer/a nylon resin layer 716/an adhesive layer or an adhesive resin layer/a polyolefin resin layer 717 in order from the side facing the container body constituent sheet material 3 (in order from the outside). In FIG. 12, the adhesive layer (or the adhesive resin layer) is not illustrated.

A design print layer (not illustrated) may be provided on the inner container constituent sheet material 71, if necessary. When the design print layer is provided on the inner container constituent sheet material 71, it is preferable to provide the design print layer so that the design can be seen from the outside of the container body.

When the design print layer is provided on the inner container constituent sheet material 71, the design print layer is provided on the outer surface of the innermost layer of the sheet material 71, or is provided on the outer surface or/and inner surface of the resin layer other than the innermost layer.

In the container body 6, the inner container constituent sheet material 71 illustrated in FIG. 11 is overlaid on an inner surface side of the container body constituent sheet material 3 illustrated in FIG. 6, the peripheral edge portions 3a and 71a of the container body constituent sheet material 3 and the inner container constituent sheet material 71 are heat-sealed with each other to form a container body constituent sheet material with an inner container constituent sheet material (hereinafter, referred to as the container body sheet material with an inner container). By bending the container body sheet material with an inner container and joining (for example, heat-sealing) the peripheral edge portions (the peripheral edge portion 71a of the container body sheet material with an inner container) to each other, the sheet material container 5 including the inner container 7 in the container body 6 is formed. After the enclosing portion 51 of the sheet material container 5 is filled with the filler such as air from the introduction port 34, for example, the introduction port 34 is sealed, whereby the sheet material container 5 in a state where the filler is filled in the enclosing portion 51 as illustrated in FIGS. 1 to 3 is obtained.

The heat sealing includes heat sealing using a heated heat seal bar or a heated roll, and heat sealing using ultrasonic sealing, high frequency sealing, or the like, and refers to all types of heat sealing regardless of the means.

Figure 13:
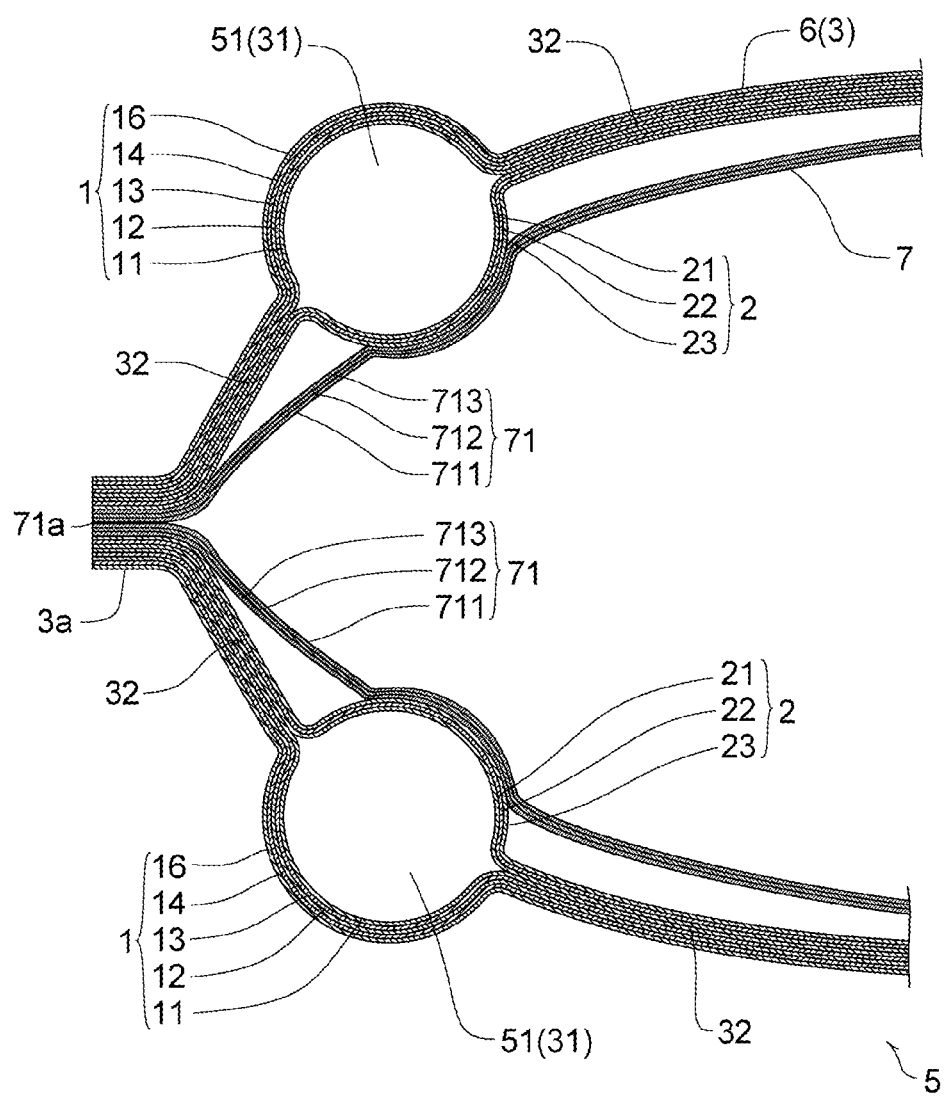
FIG. 13 is an enlarged end view of a part of FIG. 3, which illustrates a layer configuration of the first film layer, the second film layer, and an inner container constituent sheet material.

FIG. 13 is an enlarged end view of a part of the sheet material container 5 formed using the container body constituent sheet material 3 and the inner container constituent sheet material 7. FIG. 13 is also an end view illustrating in detail the layer configuration of the container body constituent sheet material 3 and the inner container constituent sheet material 71 for a part of the sheet material container 5 of FIG. 3.

In FIG. 13, the first film layer 1 has the polyolefin resin layer 11/an adhesive resin layer/the ethylene-vinyl alcohol copolymer resin layer 12/an adhesive resin layer/the polyolefin resin layer 13/the adhesive layer 14/a design print layer/the polyester resin layer 16 in order from the side (inside) facing the non-joint portion 31 or the enclosing portion 51. The second film layer 2 has the polyolefin resin layer 21/an adhesive resin layer/the ethylene-vinyl alcohol copolymer resin layer 22/an adhesive resin layer/the polyolefin resin layer 23 in order from the side (outside) facing the non-joint portion 31 or the enclosing portion 51. The inner container constituent sheet material 71 has the polyolefin resin layer 711/an adhesive layer/the polyester resin layer 712 with an inorganic vapor deposition film/an adhesive layer/the polyolefin resin layer 713 in order from the side facing the container body constituent sheet material 3 (in order from the outside). In FIG. 13, the adhesive resin layer and the adhesive layer are not illustrated except for the adhesive layer of the first film layer 1 (the same applies to FIG. 26).

As illustrated in FIG. 13, the first film layer 1 of the sheet material container 5 of the present invention has the first extruded multilayer structural part having the polyolefin resin layer 11/the ethylene-vinyl alcohol copolymer resin layer 12 on the side facing the enclosing portion 51 (preferably the first extruded multilayer structural part having the polyolefin resin layer 11/the ethylene-vinyl alcohol copolymer resin layer 12/the polyolefin resin layer 13). In the sheet material container 5 thus configured, the first film layer 1 is difficult to delaminate. That is, as in the present invention, by using the first film layer 1 having the first extruded multilayer structural part, delamination of the first film layer 1 is less likely to occur in a region corresponding to the enclosing portion 51 as compared with a conventional sheet material container. Delamination is also less likely to occur in the second film layer 2. Although the reason why delamination can be prevented for the sheet material container 5 of the present invention is not clear, it is presumed that this is due to the fact that the first film layer 1 having no nylon resin layer between the polyolefin resin layer 11 and the ethylene-vinyl alcohol copolymer resin layer 12 is used and at least the polyolefin resin layer 11 and the ethylene-vinyl alcohol copolymer resin layer 12 are stacked by extrusion molding.

[Form Suitable for Recycling]

When plastic recycling is required after the sheet material container 5 is used, it is preferable that the sheet material container 5 contains a relatively large amount of polyolefin resin. This is because polyolefin resins such as polyethylene are easy to recycle. From this point of view, it is preferable that the first film layer 1, the second film layer 2 or/and the inner container constituent sheet material 71 (including no polyester resin layer and no nylon resin layer) mainly have a polyolefin resin layer.

In one example suitable for recycling, the first film layer 1 constituting the sheet material container 5 has the first extruded multilayer structural part and the stretched polyethylene resin layer stacked on the outside of the first extruded multilayer structural part via an adhesive. Examples of the first extruded multilayer structural part include <1A> to <1D> described above, and among them, a coextruded film having a linear low-density polyethylene resin layer having heat sealability/an ethylene-vinyl alcohol copolymer resin layer/a linear low-density polyethylene resin layer having heat sealability is preferable. Examples of the stretched polyethylene resin layer include a biaxially stretched linear low-density polyethylene film (biaxially stretched LLDPE film), and a biaxially stretched high-density polyethylene film. If heat resistance to heat sealing can be obtained, a high-density polyethylene resin layer without stretching treatment can be used instead of the stretched polyethylene.

From the viewpoint of recyclability, in the bonding between the first extruded multilayer structural part and the stretched polyethylene resin layer, preferably, an adhesive for dry lamination is not used, and, for example, between the first extruded multilayer structural part and the stretched polyethylene resin layer, a polyethylene resin (LDPE) is melt-extruded for molding. The stretched polyethylene resin layer may be formed by being stacked on the outside of the first extruded multilayer structural part and then stretched together with the first extruded multilayer structural part.

In one example suitable for recycling, the second film layer 2 constituting the sheet material container 5 has the second extruded multilayer structural part described above. Examples of the second extruded multilayer structural part include <2A> to <2D> described above, and among them, a coextruded film having a linear low-density polyethylene resin layer having heat sealability/an ethylene-vinyl alcohol copolymer resin layer/a linear low-density polyethylene resin layer having heat sealability is preferable.

In one example suitable for recycling, the inner container constituent sheet material 71 is preferably a coextruded film having a linear low-density polyethylene resin layer having heat sealability/an ethylene-vinyl alcohol copolymer resin layer/a linear low-density polyethylene resin layer having heat sealability.

Each stretched polyethylene resin used for the first outermost layer and the second outermost layer, a polyethylene-based resin having heat sealability used for each of the first extruded multilayer structural part and the second extruded multilayer structural part, and a polyethylene-based resin having heat sealability used for the inner container constituent sheet material 71 preferably have the same or similar density, average molecular weight, melting point, and the like, and more preferably have the same average molecular weight. Examples thereof include the first film layer in which for the polyethylene resin used for the first outermost layer and the polyethylene resin used for the first extruded multilayer structural part, materials having the same average molecular weight are used, and the stretched polyethylene resin is stacked as the stretched polyethylene resin layer on the outside of the first extruded multilayer structural part. The same average molecular weight means that the number average molecular weight and the weight average molecular weight do not have to be completely the same, and are substantially the same including a range of variation in resin production.

Polyethylene resin can be classified into four types: high-density polyethylene, medium-density polyethylene, low-density polyethylene, and linear low-density polyethylene, according to the density, structure, and the like. It is preferable that each stretched polyethylene resin used for the first outermost layer and the second outermost layer, a polyethylene-based resin having heat sealability used for each of the first extruded multilayer structural part and the second extruded multilayer structural part, and the polyethylene-based resin having heat sealability used for the inner container constituent sheet material 71 belong to the same classification.

In particular, it is preferable that the density of a polyethylene resin as a raw material before each stretched polyethylene resin used for the first outermost layer and the second outermost layer is stretched is the same as the density of the polyethylene-based resin having heat sealability used for each of the first extruded multilayer structural part and the second extruded multilayer structural part and/or the density of the polyethylene-based resin having heat sealability used for the inner container constituent sheet material 71. That is, the polyethylene resin in the extruded multilayer structural part and the stretched polyethylene resin layer use a polyethylene resin having the same density as a raw material, and after the stretched polyethylene resin layer is subjected to stretching treatment, the first film layer 1 may be formed by being stacked on the outside of the extruded multilayer structural part. The same density means that the density does not have to be completely the same, and is substantially the same including the range of variation in resin production.

In addition, as the first extruded multilayer structural part, the second extruded multilayer structural part, and the coextruded film of the inner container constituent sheet, a film that has been coextruded and then subjected to stretching treatment can also be used. As an example of such a first film, a film formed by stretching the first extruded multilayer structural part having a polyethylene resin layer (first innermost layer)/an ethylene-vinyl alcohol copolymer resin layer/a polyethylene resin layer can be mentioned. In this case, the stretched polyethylene resin layer stacked on the outside of the first extruded multilayer structural part via an adhesive may be omitted.

In the above preferred example, the first film layer 1 and the like contain an ethylene-vinyl alcohol copolymer resin. However, since a proportion of the ethylene-vinyl alcohol copolymer resin layer in the first film layer 1 and the like is small, this resin layer does not adversely affect recycling.

Hereinafter, although other embodiments of the present invention will be described, in the description thereof, configurations and effects different from those of the above first embodiment will be mainly described, terms or symbols are used as they are for similar configurations and the like, and the description of the configuration may be omitted.

Second Embodiment

In the first embodiment, the portion other than the enclosing portion 51 is the joint portion 32 in the interlayer between the first film layer 1 and the second film layer 2, but the present invention is not limited to this.

For example, the joint portion 32 having a linear shape may be formed in the interlayer between the first film layer 1 and the second film layer 2, and the enclosing portion 51 may be defined by the joint portion 32.

Figures 14A, 14B:
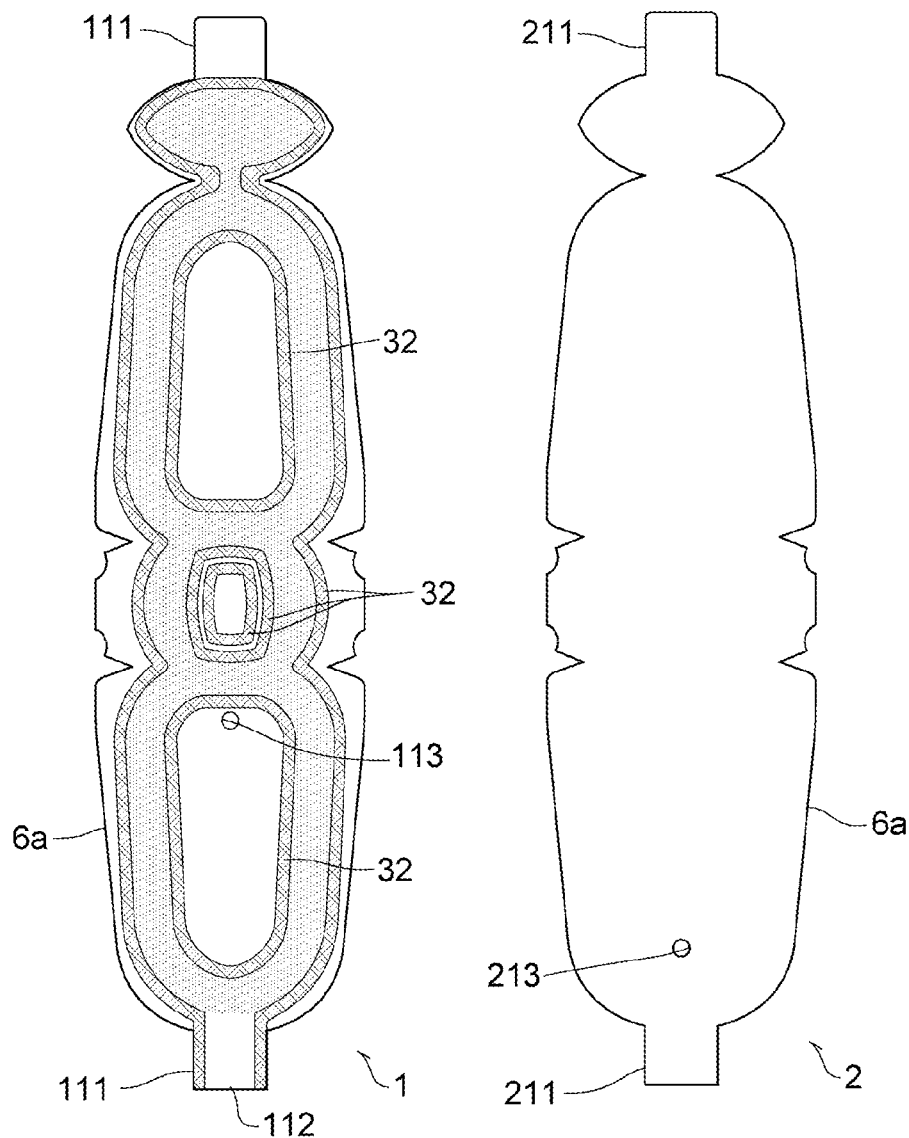
FIG. 14A is a plan view of a first film layer of a second embodiment.
FIG. 14B is a plan view of a second film layer.

FIG. 14A is a plan view of the first film layer 1 constituting a container body constituent sheet material 3 of the present embodiment, and FIG. 14B is a plan view of the second film layer 2 constituting the container body constituent sheet material 3.

The first film layer 1 and the second film layer 2 are, for example, substantially the same in shape and size in a plan view. The first film layer 1 and the second film layer 2 are provided with a pair of extension pieces 111 and 211, respectively, for introducing a filler. An inlet 112 for the filler is formed at an end edge between the extension pieces 111 and 211. A through hole 113 is formed in a portion of the first film layer 1 that forms a first main surface portion 6a, and an outside air inlet 213 formed of a through hole is formed in a portion of the second film layer 2 that forms the first main surface portion 6a.

Figure 15:
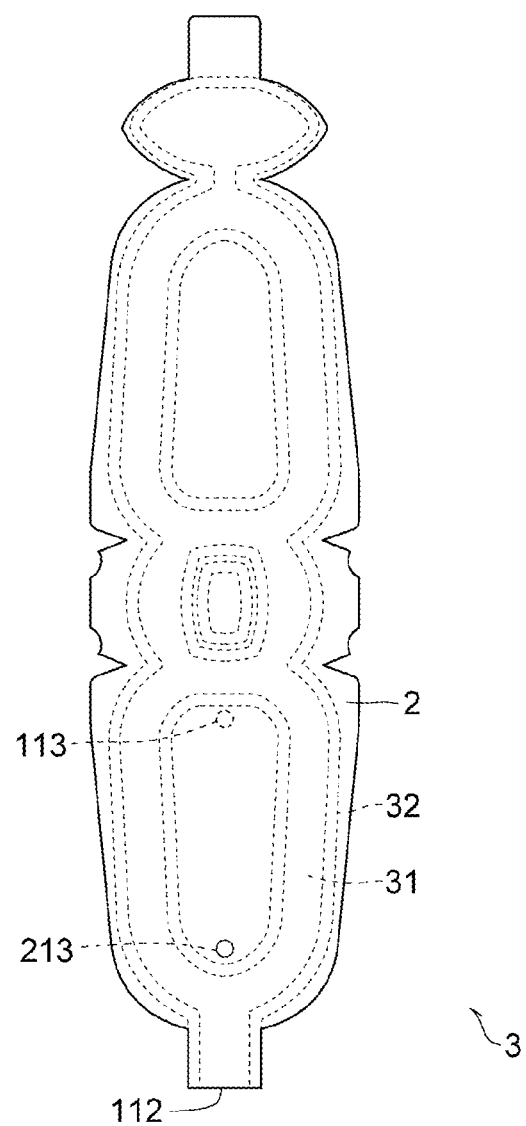
FIG. 15 is a plan view of a container body constituent sheet material.

By overlaying an outer surface of the second film layer 2 on an inner surface of the first film layer 1 and joining a linear portion represented by the shading in FIG. 14A, the container body constituent sheet material 3 as illustrated in FIG. 15 is obtained. A region partitioned by the linear joint portion 32 is the enclosing portion 51 capable of enclosing the filler. In FIG. 14A, a region serving as the enclosing portion 51 of the present embodiment is indicated by innumerable dots.

The first film layer 1 and the second film layer 2 are joined by, for example, heat sealing. As described in the first embodiment, the first film layer 1 of the present embodiment also has an extruded multilayer structural part having a polyolefin resin layer/an ethylene-vinyl alcohol copolymer resin layer on the side facing the enclosing portion, and the second film layer 2 has an extruded multilayer structural part having a polyolefin resin layer/an ethylene-vinyl alcohol copolymer resin layer/a polyolefin resin layer on the side facing the enclosing portion. In order to heat-seal the inner surface of the first film layer 1 and the outer surface of the second film layer 2 well, an innermost layer of the first film layer 1 has a polyolefin resin layer having heat sealability, and an outermost layer of the second film layer 2 has a polyolefin resin layer having heat sealability.

Figure 16A:
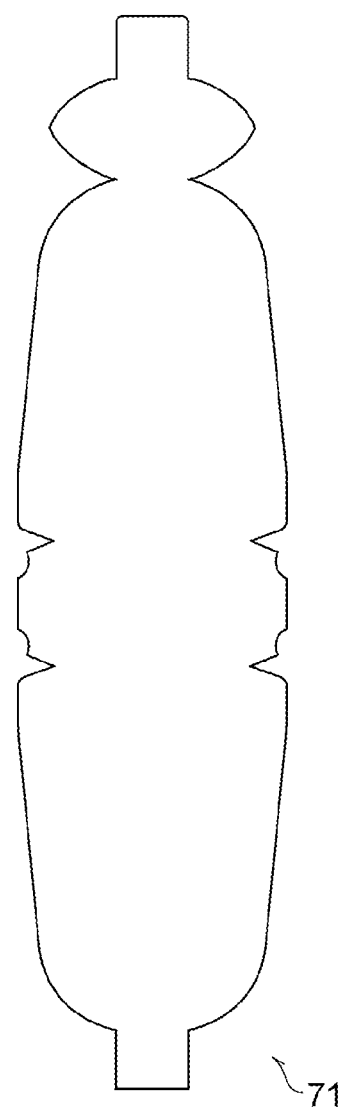
FIG. 16A is a plan view of an inner container constituent sheet material.

FIG. 16A is a plan view of an inner container constituent sheet material 71, and a plan view of a container body sheet material 8 with an inner container in which the inner container constituent sheet material 71 is overlaid on and joined to an inner surface of the container body constituent sheet material 3.

The inner container constituent sheet material 71 has, for example, substantially the same shape and the same size as the second film layer 2 in a plan view. No holes are formed in a plane of the inner container constituent sheet material 71.

Figure 16B:
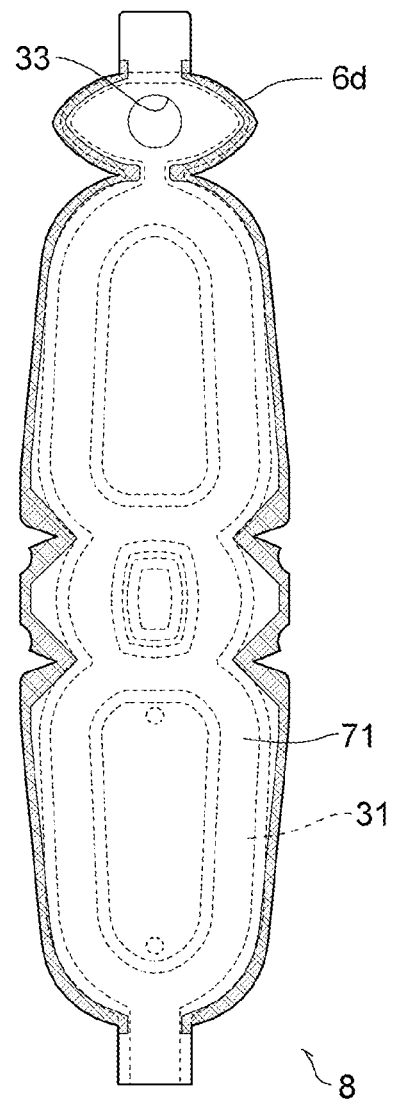
FIG. 16B is a plan view of a container body sheet material with an inner container in which the inner container constituent sheet material is joined to the container body constituent sheet material.

An outer surface of the inner container constituent sheet material 71 illustrated in FIG. 16A is overlaid on the inner surface side of the container body constituent sheet material 3 illustrated in FIG. 15 (on the inner surface side of the second film layer 2), and a peripheral edge portion of the container body constituent sheet material 3 and a peripheral edge portion of the inner container constituent sheet material 71 are joined, whereby the container body sheet material 8 with an inner container illustrated in FIG. 16B can be obtained. It is preferable that when the inner container constituent sheet material 71 is joined, a peripheral edge portion of the first film layer 1 and a peripheral edge portion of the second film layer 2 of the container body constituent sheet material 3 are also joined at the same time. In FIG. 6B, the portion (peripheral edge portion) at which the inner container constituent sheet material 71 is joined is shaded.

The container body constituent sheet material 3 and the inner container constituent sheet material 71 are joined by, for example, heat sealing. As described in the first embodiment, it is preferable to use a multilayer film having a polyolefin resin layer having heat sealability on each side of the inner container constituent sheet material 71 of the present embodiment.

As illustrated in FIG. 16B, a hole portion 33 for attaching a spout 61 is formed in a portion of the container body sheet material 8 with an inner container that forms the top gusset portion 6d. The hole portion 33 is a through hole that penetrates the first film layer 1, the second film layer 2, and the inner container constituent sheet material 71.

Figure 17A:
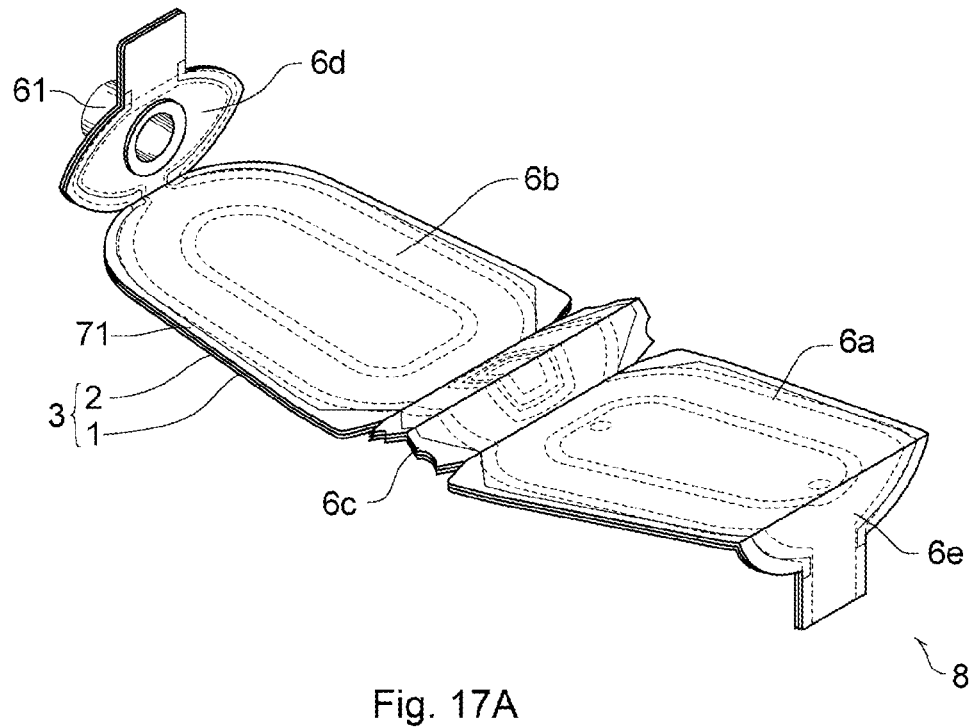
FIG. 17A is a perspective view of a state where the container body sheet material with an inner container is bent in a process of preparing a sheet material container.
Figure 17B:
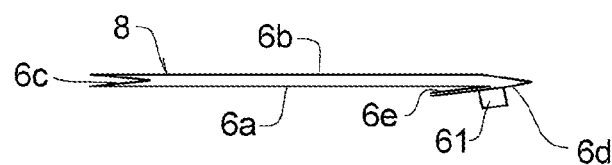
FIG. 17B is a reference side view when the container body sheet material with an inner container is flat.
Figure 18:
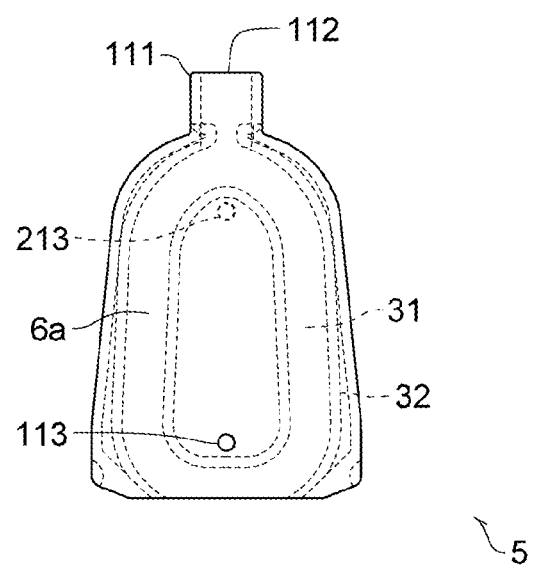
FIG. 18 is a front view of the sheet material container of the second embodiment.
Figure 19:
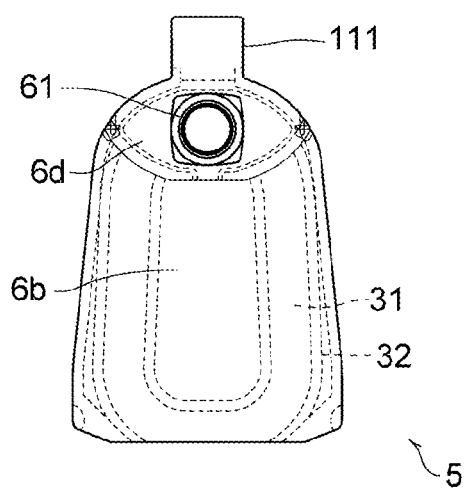
FIG. 19 is a rear view of the sheet material container.

After the spout 61 is attached to the hole portion 33, the container body sheet material 8 with an inner container is bent as illustrated in FIG. 17A. Specifically, in the container body sheet material 8 with an inner container, a portion forming a bottom gusset portion 6c is bent inward in a mountain shape, a portion forming the top gusset portion 6d is bent toward an inner surface of a portion forming a second main surface portion 6b, and a portion 6e corresponding to about half of the top gusset portion 6d of a portion forming a first main surface portion 6a is bent toward the outer surface side. After bending, as illustrated in FIG. 17B, the container body sheet material 8 with an inner container is flatten so that an inner surface of the container body sheet material 8 with an inner container comes into contact in side view, and the peripheral edge portion (inner surface of the peripheral edge portion of the container body sheet material 8 with an inner container) is joined, whereby a sheet material container 5 as illustrated in FIGS. 18 and 19 can be obtained. Similarly to the first embodiment, the sheet material container 5 of the present embodiment also includes a container body 6 formed of the sheet material 3 including the first film layer 1 and the second film layer 2, and an inner container 7, and an enclosing portion 31 capable of enclosing a filler is formed in an interlayer between the first film layer 1 and the second film layer 2.

In the above embodiment, the first film layer 1 and the second film layer 2 formed in advance in a predetermined shape are joined to form the container body constituent sheet material 3, the inner container constituent sheet material 71 formed in advance in a predetermined shape is joined to form the container body sheet material 8 with an inner container, and the container body sheet material 8 with an inner container is appropriately bent to join the peripheral edge portion, and thus to prepare the sheet material container 5. However, the production of the sheet material container 5 is not limited to this procedure.

Although not particularly illustrated, for example, sheet-like first and second film layers are overlaid on and joined to one another (joined at a portion similar to the joint portion 32 forming the enclosing portion 31), and a sheet-like inner container constituent sheet material is overlaid thereon and joined thereto (joined at portions similar to the peripheral edge portion of the container body constituent sheet material 3 and the peripheral edge portion of the inner container constituent sheet material 71). After a spout is attached to a portion of the obtained sheet-like laminate including three layers, which forms a top gusset portion, while the laminate is appropriately bent to be formed in a container shape, the peripheral edge portion is joined, and, at the same time, the outside is punched (or punched after joining), whereby the sheet material container 5 as illustrated in FIGS. 18 and 19 may be produced.

Figure 20:
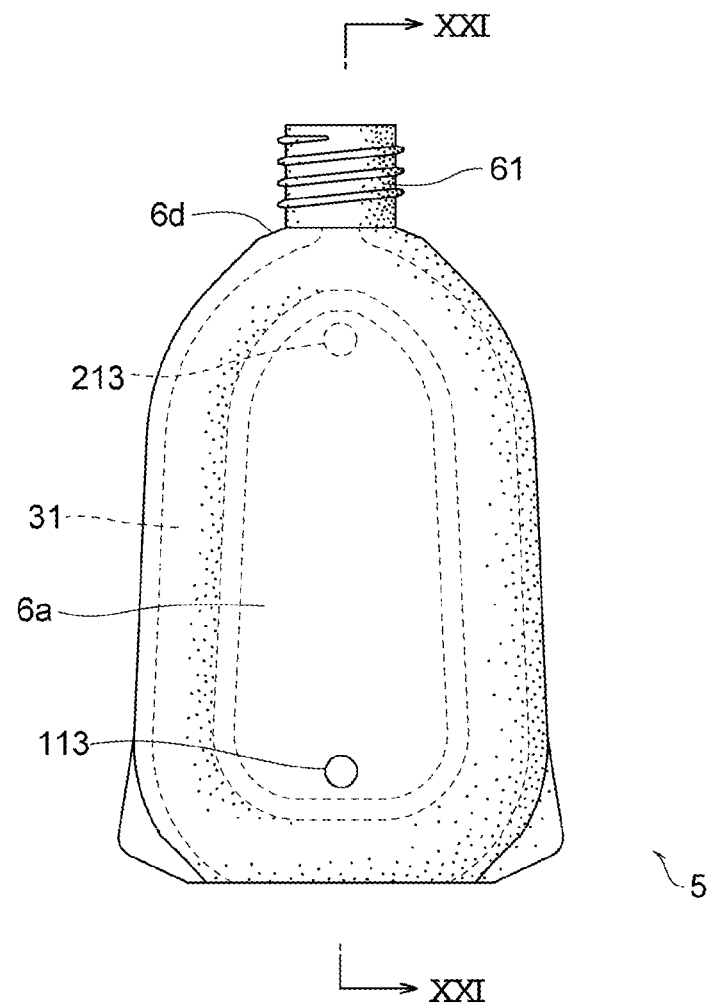
FIG. 20 is a front view of a sheet material container of the second embodiment in which a filler is enclosed in an enclosing portion.
Figure 21:
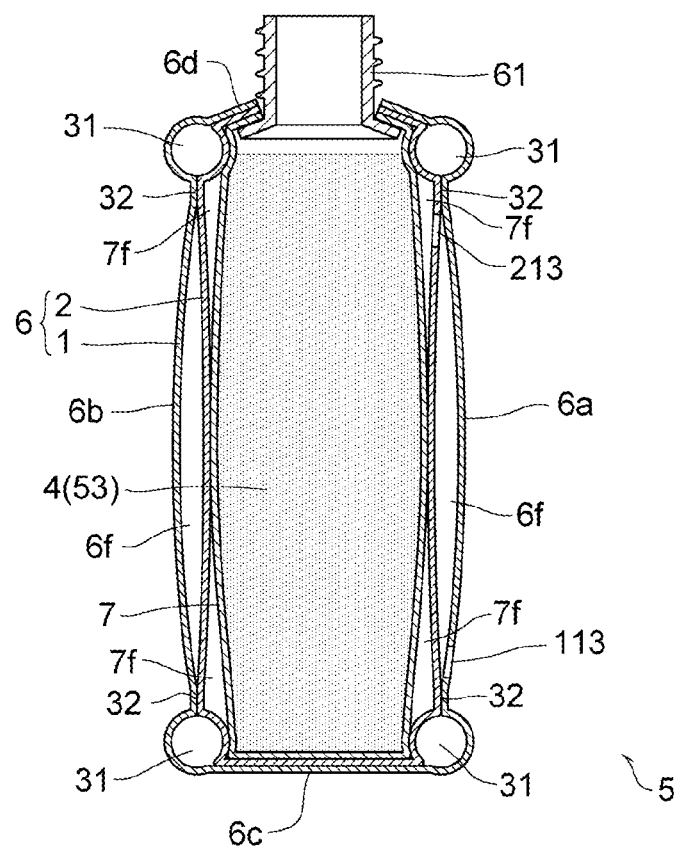
FIG. 21 is a cross-sectional view taken along the line XXI-XXI of FIG. 20.

The filler is introduced into the enclosing portion 51 from the introduction port 112 of the sheet material container 5, and the extension piece 111 for introducing a filler is removed while being sealed, whereby as illustrated in FIGS. 20 and 21, the enclosing portion 51 is filled with the filler, and the self-supportable sheet material container 5 can be obtained.

Figure 22:
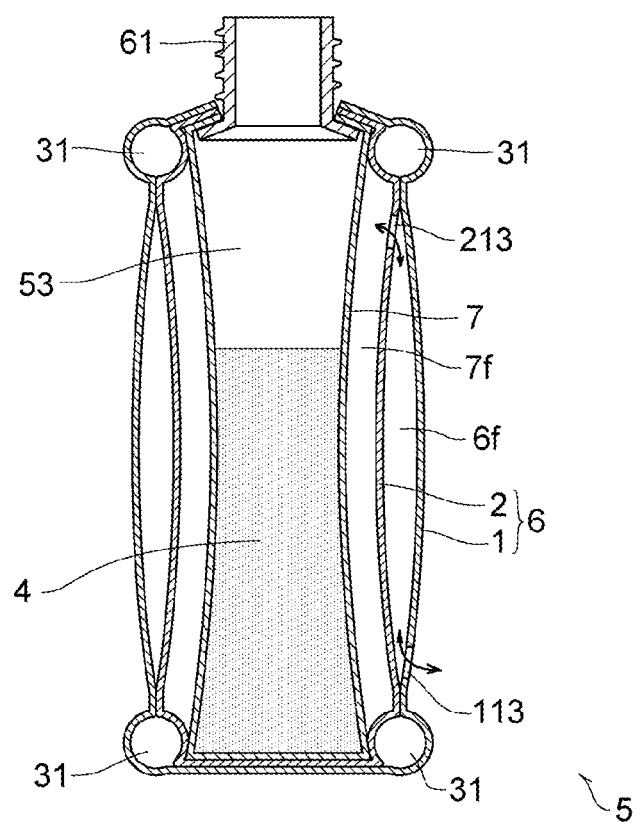
FIG. 22 is a cross-sectional view of the sheet material container in a state where an inclusion is reduced.

After an inclusion 4 is placed in an accommodation space 53 of the inner container 7 of the sheet material container 5 after filling with the filler, a cap such as a cap with a pump is attached to the spout 61. The cap is not illustrated in FIGS. 20 to 22. In FIGS. 21 and 22, the inclusion 4 stored in the accommodation space 53 is represented by dots.

In the first film layer 1 and the second film layer 2 constituting the container body 6, the through hole 113 and the outside air inlet 213 having a through hole are formed in a portion other than the enclosing portion 51 (for example, the first main surface portion 6a).

In the examples illustrated in FIGS. 20 and 21, the through hole 113 and the outside air inlet 213 are arranged in an in-plane portion of the first film layer 1 and the second film layer 2 surrounded by the enclosing portion 51.

A space between the first film layer 1 and the second film layer 2 in the portion surrounded by the enclosing portion 51 is not joined, the inner container 7 and the container body 6 (second film layer 2) are not joined, and gaps 6f and 7f (see FIG. 21) are formed, respectively. The gaps 6f and 7f communicate with the outside through the through hole 113 and the outside air inlet 213.

As an amount of the inclusion 4 contained in the inner container 7 illustrated in FIG. 21 decreases, a volume of the inner container 7 decreases as illustrated in FIG. 22. Since external air flows in and out of the gap 7f through the through hole 113 and the outside air inlet 213 (air flow is indicated by arrows), even if the inner container 7 becomes smaller as the inclusion 4 decreases, an outer shape of the container body 6 is hard to collapse. Thus, the sheet material container 5 is self-supporting in a good state even if the inclusion 4 decreases.

Third Embodiment

Figures 23A, 23B:
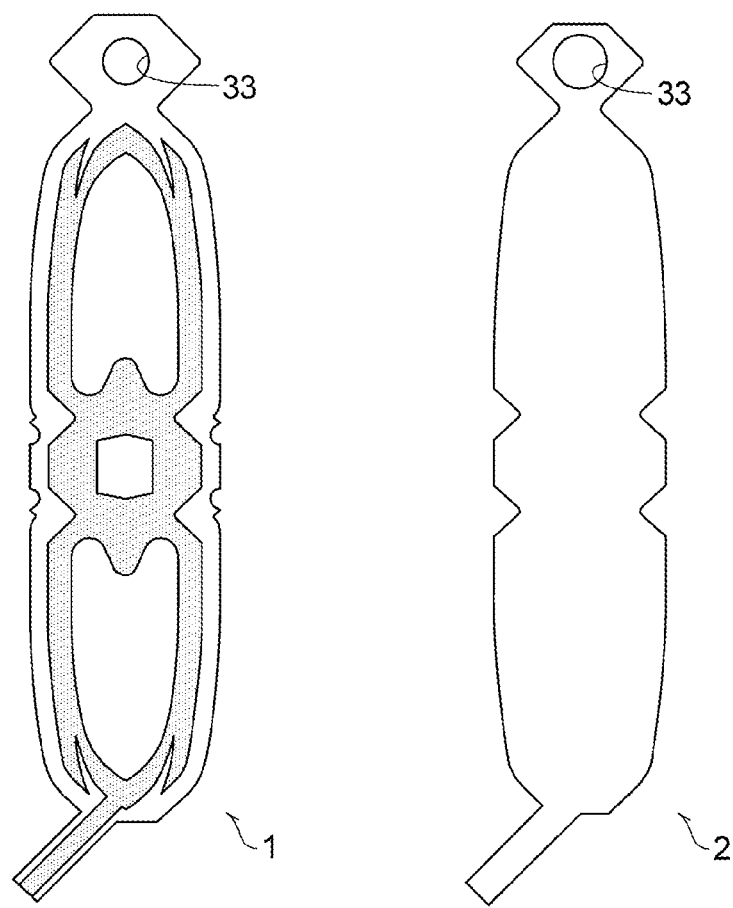
FIG. 23A is a plan view of a first film layer of a modification.
FIG. 23B is a plan view of a second film layer of the modification.

In the above embodiment, the first film layer 1 and the second film layer 2 are formed to have substantially the same shape and the same size in a plan view. However, as illustrated in FIG. 23, the second film layer 2 may be formed slightly smaller than the first film layer 1 in a plan view. In FIG. 23, the portion subjected to the non-joint processing is indicated by innumerable dots.

Figure 24:
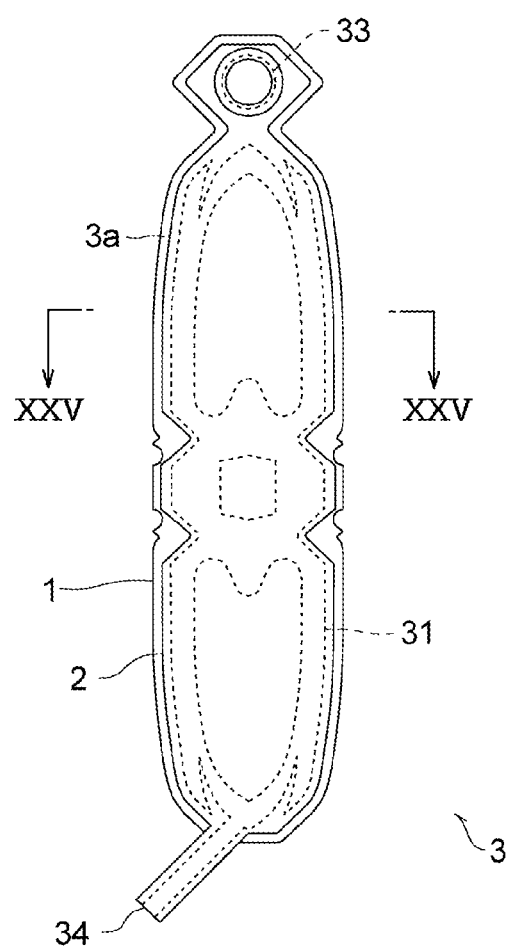
FIG. 24 is a plan view of the sheet material constituting the container body of the sheet material container of the modification.
Figure 25:
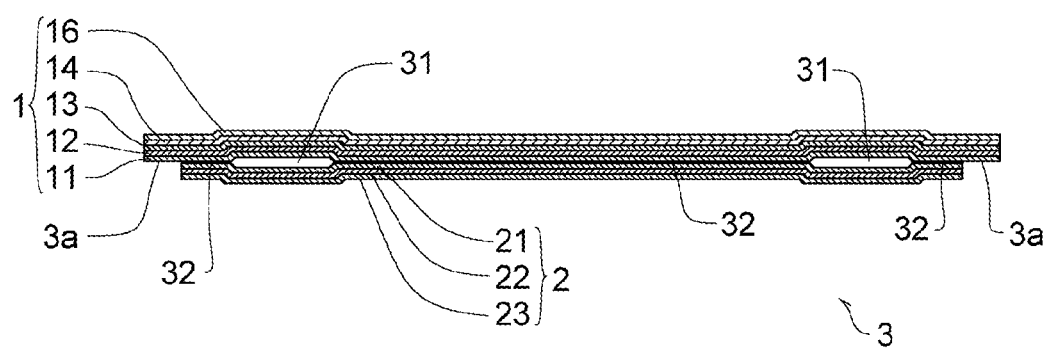
FIG. 25 is an enlarged end view taken along the line XXV-XXV of FIG. 24.

FIGS. 24 and 25 illustrate the container body constituent sheet material 3 in which the first film layer 1 and the second film layer 2 having the same shape are stacked. Since the second film layer 2 is slightly smaller than the first film layer 1 in a plan view, an inner surface of the first film layer 1 is exposed at a peripheral edge portion 3a of the container body constituent sheet material 3.

Similarly to the above embodiment, an inner container constituent sheet material 71 illustrated in FIG. 11 is overlaid on an inner surface side of the container body constituent sheet material 3 illustrated in FIG. 24, and the peripheral edge portions 3a (exposed inner surface of the first film layer 1) of the container body constituent sheet material 3 and a peripheral edge portion 71a of the inner container constituent sheet material 71 are joined by heat sealing or the like to form a container body constituent sheet material with an inner container. The container body constituent sheet material with an inner container is bent inward, and while the peripheral edge portions are joined to each other, a non-joint portion 31 is filled with a filler and sealed, whereby a sheet material container 5 including an inner container 7 in a container body 6 as illustrated in FIG. 26 is formed.

Figure 26:
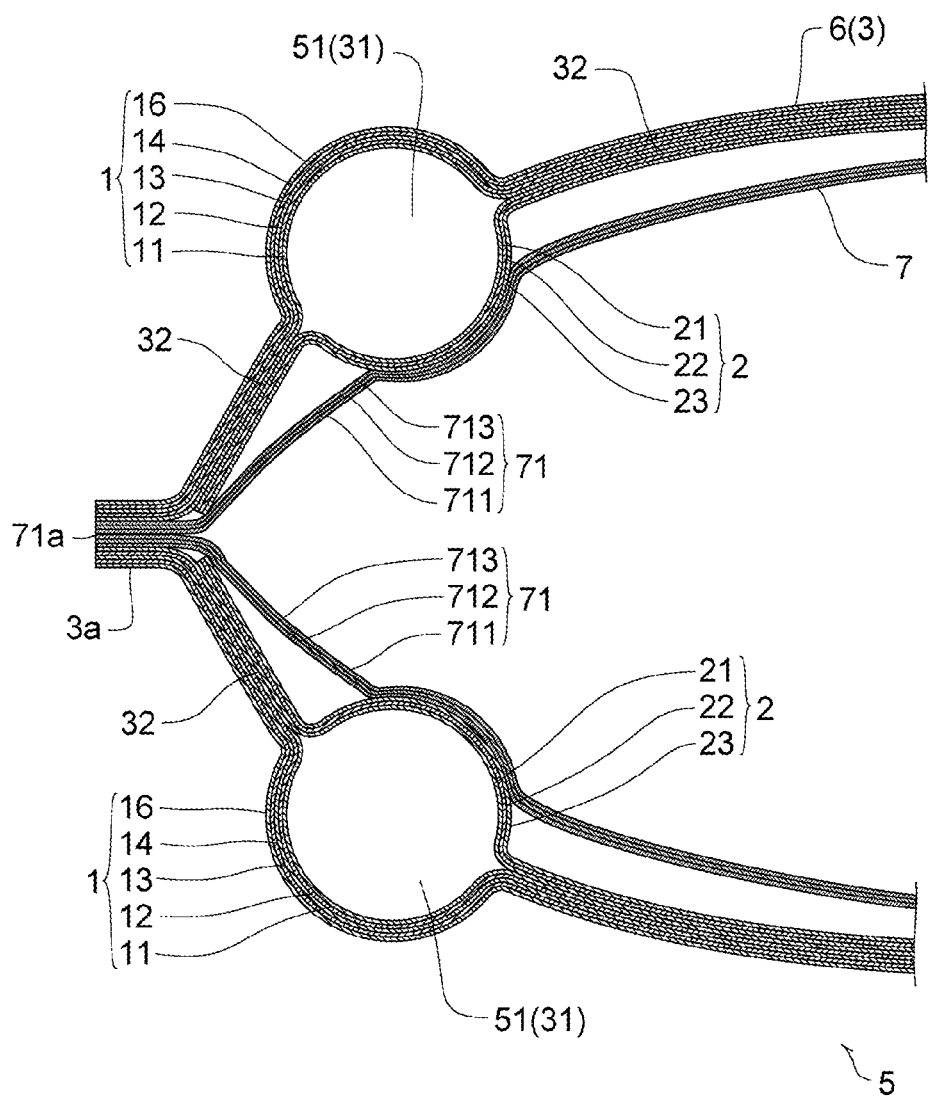
FIG. 26 is an enlarged end view of a portion of the sheet material container of the modification, which is the same portion as in FIG. 13.

As illustrated in FIG. 26, the sheet material container 5 of this modification is different from the sheet-like container of the above embodiment in that the second film layer 2 is not interposed at the peripheral edge portion 3a, and the remaining configuration is the same.

[Others]

In the above-described embodiments and modification, the sheet material container including the container body and the inner container has been described. However, in other embodiments, the sheet material container having no inner container may be used. Such other embodiments include the following aspects.

<Aspect 1>

A sheet material container including a container body that defines an accommodation space for accommodating an inclusion, in which the container body is formed of a sheet material including a first film layer and a second film layer disposed inside the first film layer, the sheet material of the container body has a joint portion at which an interlayer between the first film layer and the second film layer is joined and an enclosing portion in which a filler can be enclosed in the interlayer between the first film layer and the second film layer, and the first film layer has an extruded multilayer structural part having a polyolefin resin layer/an ethylene-vinyl alcohol copolymer resin layer on a side facing the enclosing portion.

<Aspect 2>

In the aspect 1, the extruded multilayer structural part of the first film layer has a polyolefin resin layer/an ethylene-vinyl alcohol copolymer resin layer/a polyolefin resin layer.

<Aspect 3>
In the aspect 1 or 2, the extruded multilayer structural part of the first film layer is formed by coextrusion.
<Aspect 4>
In any of the aspects 1 to 3, the second film layer has an extruded multilayer structural part having a polyolefin resin layer/an ethylene-vinyl alcohol copolymer resin layer/a polyolefin resin layer on the side facing the enclosing portion.
<Aspect 5>
In any of the aspects 1 to 4, the polyolefin resin layer of the second film layer is a linear low-density polyethylene resin layer.
<Aspect 6>
In any of the aspects 1 to 5, the polyolefin resin layer of the first film layer is a linear low-density polyethylene resin layer.
<Aspect 7>
In any of the aspects 1 to 6, the first film layer has the extruded multilayer structural part and a polyester resin layer stacked on an outside of the extruded multilayer structural part, and the polyester resin layer constitutes an outer surface of the container body.
<Aspect 8>
In any of the aspects 1 to 6, the first film layer has the extruded multilayer structural part and a stretched polyethylene resin layer stacked on an outside of the extruded multilayer structural part, and the stretched polyethylene resin layer constitutes an outer surface of the container body.
<Aspect 9>
In the aspect 8, the stretched polyethylene resin layer is formed by biaxial stretching.
<Aspect 10>
In the aspect 8 or 9, a polyolefin resin layer of the first film layer is a polyethylene resin layer, and an average molecular weight of a polyethylene resin used for the polyethylene resin layer and an average molecular weight of a polyethylene resin used for the stretched polyethylene resin layer are the same.
<Aspect 11>
In any of the aspects 8 to 10, the stretched polyethylene resin layer is formed by being stacked on the outside of the extruded multilayer structural part and then stretched.
<Aspect 12>
In any of the aspects 8 to 10, the first film layer is formed by melt-extruding a polyethylene resin between the extruded multilayer structural part and the stretched polyethylene resin layer.
<Aspect 13>
In any of the aspects 1 to 12, a tensile elongation in an MD direction or/and a TD direction of the extruded multilayer structural part of the first film layer is 300% or more, preferably 400% or more, and more preferably 500% or more.
<Aspect 14>
In any of the aspects 1 to 13, a tensile elongation in an MD direction or/and a TD direction of the extruded multilayer structural part of the first film layer is 900% or less, preferably 800% or less, and more preferably 700% or less.
<Aspect 15>
In any of the aspects 1 to 14, a tensile elongation in an MD direction or/and a TD direction of the extruded multilayer structural part of the second film layer is 300% or more, preferably 400% or more, and more preferably 500% or more.
<Aspect 16>
In any of the aspects 1 to 15, a tensile elongation in an MD direction or/and a TD direction of the extruded multilayer structural part of the second film layer is 900% or less, preferably 800% or less, and more preferably 700% or less.
<Aspect 17>
In any of the aspects 1 to 16, the filler is enclosed in the enclosing portion.
<Aspect 18>
A sheet material container including a container body that defines an accommodation space for accommodating an inclusion, in which the container body is formed of a sheet material including a first film layer and a second film layer disposed inside the first film layer, the sheet material of the container body has a joint portion at which an interlayer between the first film layer and the second film layer is joined and an enclosing portion in which a filler can be enclosed in the interlayer between the first film layer and the second film layer, the first film layer has an extruded multilayer structural part having a polyolefin resin layer/an ethylene-vinyl alcohol copolymer resin layer/a polyolefin resin layer on a side facing the enclosing portion, the polyolefin resin layer is a stretched polyethylene resin layer, and the stretched polyethylene resin layer is formed by stretching the extruded multilayer structural part after the extruded multilayer structural part is formed.
<Aspect 19>
In the aspect 18, the filler is enclosed in the enclosing portion.
<Aspect 20>
The aspect 18 or 19 includes an inner container that is an inner container covered by the container body and defines an accommodation space.
<Aspect 21>
A sheet material container including a container body that defines an accommodation space for accommodating an inclusion, in which the container body is formed of a sheet material including a first film layer and a second film layer disposed inside the first film layer, the sheet material of the container body has a joint portion at which an interlayer between the first film layer and the second film layer is joined and an enclosing portion in which a filler can be enclosed in the interlayer between the first film layer and the second film layer, the first film layer has an extruded multilayer structural part having a polyolefin resin layer/an ethylene-vinyl alcohol copolymer resin layer/a polyolefin resin layer on a side facing the enclosing portion, and has a stretched polyethylene resin layer stacked on the outside of the extruded multilayer structural part, the polyolefin resin layer is a polyethylene resin layer, a density of a polyethylene resin as a raw material before the stretched polyethylene resin layer is stretched is the same as a density of the polyethylene resin layer of the extruded multilayer structural part, and the first film layer is formed by being stacked on the outside of the extruded multilayer structural part after the stretched polyethylene resin layer is subjected to stretching treatment.
<Aspect 22>
In the aspect 21, the filler is enclosed in the enclosing portion.
<Aspect 23>
In the aspect 21 or 22, an inner container that is covered by the container body and defines an accommodation space is included.

EXAMPLES

The present invention will be further described in detail below with reference to Examples and Comparative Examples. However, the present invention is not limited only to the following examples.

A linear low-density polyethylene resin is described as "LLDPE", a low-density polyethylene resin is described as "LDPE", an ethylene-vinyl alcohol copolymer resin is described as "EVOH", a nylon resin is described as "Ny", a polyethylene terephthalate resin is described as "PET", an adhesive resin is described as "AD", and a dry laminate adhesive is described as "Dry". Transparent vapor deposition means that a silica vapor deposition film is vapor-deposited on one side.

The coextruded films used in Examples and Comparative Examples were not subjected to stretching treatment after the film formation.

Example 1

As the first film layer, a coextruded film of an LLDPE layer having a thickness of 30 μm/an AD layer having a thickness of 4 μm/an EVOH layer having a thickness of 10 μm/an AD layer having a thickness of 4 μm/an LLDPE layer having a thickness of 100 μm in order from the outside was provided.

As the second film layer, a coextruded film of an LLDPE layer having a thickness of 100 μm/an AD layer having a thickness of 4 μm/an EVOH layer having a thickness of 10 μm/an AD layer having a thickness of 4 μm/an LLDPE layer having a thickness of 30 μm in order from the outside was provided.

In order to form a joint portion after the inner surface (LLDPE layer having a thickness of 100 μm) of the first film layer and the outer surface (LLDPE layer having a thickness of 100 μm) of the second film layer were overlaid on one another, a heating bar was pressed against a portion other than the non-joint portion from the outer surface of the first film layer and the inner surface of the second film layer to heat the portion, whereby a container body constituent sheet material in which the non-joint portion and the joint portion were formed in the interlayer between the first film layer and the second film layer as illustrated in FIG. 6 was prepared.

Example 2

A container body constituent sheet material was prepared in the same manner as in Example 1, except that a coextruded film of an LLDPE layer having a thickness of 30 μm/an AD layer having a thickness of 4 μm/an EVOH layer having a thickness of 10 μm/an AD layer having a thickness of 4 μm/an LLDPE layer having a thickness of 40 μm in order from the outside was used as the first film layer, and a coextruded film of an LLDPE layer having a thickness of 40 μm/an AD layer having a thickness of 4 μm/an EVOH layer having a thickness of 10 μm/an AD layer having a thickness of 4 μm/an LLDPE layer having a thickness of 30 μm in order from the outside was used as the second film layer.

Example 3

A container body constituent sheet material was prepared in the same manner as in Example 1, except that a coextruded film of an LLDPE layer having a thickness of 25 μm/an AD layer having a thickness of 4 μm/an Ny layer having a thickness of 7.5 μm/an AD layer having a thickness of 4 μm/an EVOH layer having a thickness of 10 μm/an AD layer having a thickness of 4 μm/an Ny layer having a thickness of 7.5 μm/an AD layer having a thickness of 4 μm/an LLDPE layer having a thickness of 50 μm in order from the outside was used as the second film layer.

Example 4

A container body constituent sheet material was prepared in the same manner as in Example 1, except that a coextruded film of an LLDPE layer having a thickness of 18 μm/an AD layer having a thickness of 4 μm/an EVOH layer having a thickness of 6 μm/an AD layer having a thickness of 4 μm/an LLDPE layer having a thickness of 18 μm in order from the outside was used as the first film layer, and a coextruded film of an LLDPE layer having a thickness of 18 μm/an AD layer having a thickness of 4 μm/an EVOH layer having a thickness of 6 μm/an AD layer having a thickness of 4 μm/an LLDPE layer having a thickness of 18 μm in order from the outside was used as the second film layer.

Comparative Example 1

A container body constituent sheet material was prepared in the same manner as in Example 1, except that a coextruded film of an LLDPE layer having a thickness of 25 μm/an AD layer having a thickness of 4 μm/an Ny layer having a thickness of 7.5 μm/an AD layer having a thickness of 4 μm/an EVOH layer having a thickness of 10 μm/an AD layer having a thickness of 4 μm/an Ny layer having a thickness of 7.5 μm/an AD layer having a thickness of 4 μm/an LLDPE layer having a thickness of 50 μm in order from the outside was used as the first film layer, and a coextruded film of an LLDPE layer having a thickness of 25 μm/an AD layer having a thickness of 4 μm/an Ny layer having a thickness of 7.5 μm/an AD layer having a thickness of 4 μm/an EVOH layer having a thickness of 10 μm/an AD layer having a thickness of 4 μm/an Ny layer having a thickness of 7.5 μm/an AD layer having a thickness of 4 μm/an LLDPE layer having a thickness of 50 μm in order from the outside was used as the second film layer.

Comparative Example 2

A container body constituent sheet material was prepared in the same manner as in Example 1, except that a laminate film of an LLDPE layer having a thickness of 25 μm/a Dry layer/a transparent vapor-deposited biaxially stretched Ny layer having a thickness of 15 μm/a Dry layer/an LLDPE layer having a thickness of 40 μm in order from the outside was used as the first film layer, and a laminate film of an LLDPE layer having a thickness of 40 μm/a Dry layer/a transparent vapor-deposited biaxially stretched Ny layer having a thickness of 15 μm/a Dry layer/an LLDPE layer having a thickness of 25 μm in order from the outside was used as the second film layer.

Comparative Example 3

A container body constituent sheet material was prepared in the same manner as in Example 1, except that a laminate film of an LLDPE layer having a thickness of 25 μm/a Dry layer/a transparent vapor-deposited biaxially stretched Ny layer having a thickness of 15 μm/a Dry layer/an LLDPE layer having a thickness of 30 μm in order from the outside was used as the first film layer, and a laminate film of an LLDPE layer having a thickness of 30 μm/a Dry layer/a transparent vapor-deposited biaxially stretched Ny layer having a thickness of 15 μm/a Dry layer/an LLDPE layer having a thickness of 25 μm in order from the outside was used as the second film layer.

Comparative Example 4

A container body constituent sheet material was prepared in the same manner as in Example 1, except that a laminate film of an LLDPE layer having a thickness of 25 μm/a Dry layer/a transparent vapor-deposited biaxially stretched PET layer having a thickness of 12 μm/a Dry layer/an LLDPE layer having a thickness of 30 μm in order from the outside was used as the first film layer, and a laminate film of an LLDPE layer having a thickness of 30 μm/a Dry layer/a transparent vapor-deposited biaxially stretched PET layer having a thickness of 12 μm/a Dry layer/an LLDPE layer having a thickness of 25 μm in order from the outside was used as the second film layer.

Comparative Example 5

A container body constituent sheet material was prepared in the same manner as in Example 1, except that a laminate film of an LLDPE layer having a thickness of 20 μm/a Dry layer/a biaxially stretched EVOH layer having a thickness of 12 μm/a Dry layer/an LLDPE layer having a thickness of 25 μm in order from the outside was used as the first film layer, and a laminate film of an LLDPE layer having a thickness of 25 μm/a Dry layer/a biaxially stretched EVOH layer having a thickness of 12 μm/a Dry layer/an LLDPE layer having a thickness of 20 μm in order from the outside was used as the second film layer.

[Durability Test with Air Pressure of 40 kPa]

Air was introduced (air pressure 40 kPa) as a filler into the enclosing portion (non-joint portion) from an inlet of the container body constituent sheet material of Examples 1 to 4 and Comparative Examples 1 to 5, and the inlet was heat-sealed in that state and closed (that is, an enclosing portion with an internal pressure of 40 kPa was formed). In this way, two container body constituent sheet materials (samples) in which the enclosing portion with an internal pressure of 40 kPa was formed were prepared. Then, (a) one sample was allowed to stand in a constant temperature and humidity chamber at 40° C. and a humidity of 75% RH, and (b) another sample was allowed to stand in a constant temperature and humidity chamber at 50° C. and a humidity of 20% RH. The state of each sample was checked every day. The results are shown in Table 1.

[Durability Test with Air Pressure of 60 kPa]

The state of each sample was checked in the same manner as in the above [Durability test with air pressure of 40 kPa] except that the air pressure was set to 60 kPa. The results are shown in Table 1.

"Good" in Tables 1 to 3 indicates that no change was observed in the sample for 30 days or more. "Poor" in Tables 1 and 2 indicates that a region of the first film layer corresponding to the enclosing portion was partially delaminated, and "Very poor" indicates that the region of the first film layer corresponding to the enclosing portion has been torn in a thickness direction and the air in the enclosing portion has been released. (How many days) in Tables 1 and 2 represents an elapsed date in which delamination represented by the "Poor" was observed and an elapsed date in which air release represented by "Very poor" was observed. No delamination was observed in the second film layer as a whole, including the region corresponding to the enclosing portion.

Blanks in Table 1 mean that the test has not been performed at that temperature and humidity.

TABLE 1

| | Sheet material | Layer configuration | 40 kPa | | 60 kPa | |
|---|---|---|---|---|---|---|
| | | | 40° C., 75% RH | 50° C., 20% RH | 40° C., 75% RH | 50° C., 20% RH |
| Example 1 | First film layer | LLDPE 30 μm/AD 4 μm/EVOH 10 μm/AD 4 μm/LLDPE 100 μm | Good | Good | Good | Good |
| | Second film layer | LLDPE 100 μm/AD 4 μm/EVOH 10 μm/AD 4 μm/LLDPE 30 μm | | | | |
| Example 2 | First film layer | LLDPE 30 μm/AD 4 μm/EVOH 10 μm/AD 4 μm/LLDPE 40 μm | Good | Good | Good | Good |
| | Second film layer | LLDPE 40 μm/AD 4 μm/EVOH 10 μm/AD 4 μm/LLDPE 30 μm | | | | |
| Example 3 | First film layer | LLDPE 30 μm/AD 4 μm/EVOH 10 μm/AD 4 μm/LLDPE 100 μm | Good | Good | Good | Good |
| | Second film layer | LLDPE 25 μm/AD 4 μm/Ny 7.5 μm/AD 4 μm/EVOH 10 μm/AD 4 μm/Ny 7.5 μm/AD 4 μm/LLDPE 50 μm | | | | |
| Example 4 | First film layer | LLDPE 18 μm/AD 4 μm/EVOH 6 μm/AD 4 μm/LLDPE 18 μm | Good | Good | | |
| | Second film layer | LLDPE 18 μm/AD 4 μm/EVOH 6 μm/AD 4 μm/LLDPE 18 μm | | | | |
| Comparative Example 1 | First film layer | LLDPE 25 μm/AD 4 μm/Ny 7.5 μm/AD 4 μm/EVOH 10 μm/AD 4 μm/Ny 7.5 μm/AD 4 μm/LLDPE 50 μm | Good | Poor (3 days) | Good | Poor (2 days) |
| | Second film layer | LLDPE 25 μm/AD 4 μm/Ny 7.5 μm/AD 4 μm/EVOH 10 μm/AD 4 μm/Ny 7.5 μm/AD 4 μm/LLDPE 50 μm | | | | |
| Comparative Example 2 | First film layer | LLDPE 25 μm/Dry/vapor-deposited Ny 15 μm/Dry/LLDPE 40 μm | Poor (6 days) | Poor (6 days) | Poor (4 days) | Poor (10 days) |
| | Second film layer | LLDPE 40 μm/Dry/vapor-deposited Ny 15 μm/Dry/LLDPE 25 μm | | | | |

TABLE 1-continued

|  | Sheet material | Layer configuration | 40 kPa | | 60 kPa | |
| --- | --- | --- | --- | --- | --- | --- |
|  |  |  | 40° C., 75% RH | 50° C., 20% RH | 40° C., 75% RH | 50° C., 20% RH |
| Comparative Example 3 | First film layer | LLDPE 25 μm/Dry/vapor-deposited Ny 15 μm/Dry/LLDPE 30 μm | Very poor (1 day) | Very poor (1 day) | Very poor (1 day) |  |
|  | Second film layer | LLDPE 30 μm/Dry/vapor-deposited Ny 15 μm/Dry/LLDPE 25 μm |  |  |  |  |
| Comparative Example 4 | First film layer | LLDPE 25 μm/Dry/vapor-deposited PET 12 μm/Dry/LLDPE 30 μm | Very poor (1 day) | Very poor (1 day) | Very poor (1 day) | Very poor (1 day) |
|  | Second film layer | LLDPE 30 μm/Dry/vapor-deposited PET 12 μm/Dry/LLDPE 25 μm |  |  |  |  |
| Comparative Example 5 | First film layer | LLDPE 20 μm/Dry/EVOH 12 μm/Dry/LLDPE 25 μm | Very poor (1 day) | Very poor (1 day) | Very poor (1 day) | Very poor (1 day) |
|  | Second film layer | LLDPE 25 μm/Dry/EVOH 12 μm/Dry/LLDPE 20 μm |  |  |  |  |

Example 5

A container body constituent sheet material was prepared in the same manner as in Example 1, except that a film of a biaxially stretched PET layer having a thickness of 12 μm/a Dry layer/an LLDPE layer having a thickness of 30 μm/an AD layer having a thickness of 4 μm/an EVOH layer having a thickness of 10 μm/an AD layer having a thickness of 4 μm/an LLDPE layer having a thickness of 100 μm in order from the outside was used as the first film layer, and a film of an LLDPE layer having a thickness of 100 μm/an AD layer having a thickness of 4 μm/an EVOH layer having a thickness of 10 μm/an AD layer having a thickness of 4 μm/an LLDPE layer having a thickness of 30 μm/a Dry layer/a biaxially stretched PET layer having a thickness of 12 μm in order from the outside was used as the second film layer. A coextruded film was used for the LLDPE layer/the AD layer/the EVOH layer/the AD layer/the LLDPE layer of the first film layer and the second film layer. The first film layer and the second film layer were prepared by laminating a biaxially stretched PET film on the coextruded film via a dry laminate adhesive (Dry).

Example 6

A container body constituent sheet material was prepared in the same manner as in Example 1, except that a film of a biaxially stretched PET layer having a thickness of 12 μm/an LDPE layer having a thickness of 15 μm/an LLDPE layer having a thickness of 30 μm/an AD layer having a thickness of 4 μm/an EVOH layer having a thickness of 10 μm/an AD layer having a thickness of 4 μm/an LLDPE layer having a thickness of 100 μm in order from the outside was used as the first film layer, and a film of an LLDPE layer having a thickness of 100 μm/an AD layer having a thickness of 4 μm/an EVOH layer having a thickness of 10 μm/an AD layer having a thickness of 4 μm/an LLDPE layer having a thickness of 30 μm/an LDPE layer having a thickness of 15 μm/a biaxially stretched PET layer having a thickness of 12 μm in order from the outside was used as the second film layer.

The first film layer and the second film layer were each an extruded film formed by melt-extruding LDPE with a thickness of 15 μm between a coextruded film of an LLDPE layer having a thickness of 30 μm/an AD layer having a thickness of 4 μm/an EVOH layer having a thickness of 10 μm/an AD layer having a thickness of 4 μm/an LLDPE layer having a thickness of 100 μm and a biaxially stretched PET film having a thickness of 12 μm. An anchor coat layer was provided in advance on one side (melt extruded surface of LDPE) of the biaxially stretched PET film.

Comparative Example 6

A container body constituent sheet material was prepared in the same manner as in Example 1, except that a film of a biaxially stretched PET layer having a thickness of 12 μm/a Dry layer/an LLDPE layer having a thickness of 25 μm/an AD layer having a thickness of 4 μm/an Ny layer having a thickness of 7.5 μm/an AD layer having a thickness of 4 μm/an EVOH layer having a thickness of 10 μm/an AD layer having a thickness of 4 μm/an Ny layer having a thickness of 7.5 μm/an AD layer having a thickness of 4 μm/an LLDPE layer having a thickness of 50 μm in order from the outside was used as the first film layer, and a film of LLDPE layer having a thickness of 50 μm/an AD layer having a thickness of 4 μm/an Ny layer having a thickness of 7.5 μm/an AD layer having a thickness of 4 μm/an EVOH layer having a thickness of 10 μm/an AD layer having a thickness of 4 μm/an Ny layer having a thickness of 7.5 μm/an AD layer having a thickness of 4 μm/an LLDPE layer having a thickness of 25 μm/a Dry layer/a biaxially stretched PET layer having a thickness of 12 μm in order from the outside was used as the second film layer. A coextruded film was used for the LLDPE layer/the AD layer/the Ny layer/the AD layer/the EVOH layer/the AD layer/the Ny layer/the AD layer/the LLDPE layer of the first film layer and the second film layer. The first film layer and the second film layer were prepared by laminating a biaxially stretched PET film on the coextruded film via a dry laminate adhesive (Dry).

Comparative Example 7

A container body constituent sheet material was prepared in the same manner as in Example 1, except that a film of a biaxially stretched PET layer having a thickness of 12 μm/an LDPE layer having a thickness of 15 μm/an LLDPE layer having a thickness of 25 μm/an AD layer having a thickness of 4 μm/an Ny layer having a thickness of 7.5 μm/an AD layer having a thickness of 4 μm/an EVOH layer having a thickness of 10 μm/an AD layer having a thickness of 4 μm/an Ny layer having a thickness of 7.5 μm/an AD layer having a thickness of 4 μm/an LLDPE layer having a thickness of 50 μm in order from the outside was used as the first film layer, and a film of an LLDPE layer having a thickness of 50 μm/an AD layer having a thickness of 4 μm/an EVOH layer having a thickness of 10 μm/an AD layer having a thickness of 4 μm/an Ny layer having a thickness of 7.5 μm/an AD layer having a thickness of 4 μm/an LLDPE layer having a thickness of 25 μm/an LDPE layer having a thickness of 15 μm/a biaxially stretched PET layer having a thickness of 12 μm in order from the outside was used as the second film layer.

This film was an extruded film formed by melt-extruding LDPE with a thickness of 15 μm between a coextruded film of an LLDPE layer having a thickness of 25 μm/an AD layer having a thickness of 4 μm/an Ny layer having a thickness of 7.5 μm/an AD layer having a thickness of 4 μm/an EVOH layer having a thickness of 10 μm/an AD layer having a thickness of 4 μm/an Ny layer having a thickness of 7.5 μm/an AD layer having a thickness of 4 μm/an LLDPE layer having a thickness of 50 μm and a biaxially stretched PET film having a thickness of 12 μm. An anchor coat layer was provided in advance on one side (melt extruded surface of LDPE) of the biaxially stretched PET film.

Comparative Example 8

A container body constituent sheet material was prepared in the same manner as in Example 1, except that a laminate film of a biaxially stretched PET layer having a thickness of 12 μm/a Dry layer/a transparent vapor-deposited biaxially stretched PET layer having a thickness of 12 μm/a Dry layer/a biaxially stretched Ny layer having a thickness of 15 μm/a Dry layer/an LLDPE layer having a thickness of 50 μm in order from the outside was used as the first film layer, and a laminate film of an LLDPE layer having a thickness of 50 μm/a Dry layer/a biaxially stretched Ny layer having a thickness of 15 μm/a Dry layer/a transparent vapor-deposited biaxially stretched PET layer having a thickness of 12 μm/a Dry layer/a biaxially stretched PET layer having a thickness of 12 μm in order from the outside was used as the second film layer.

Comparative Example 9

A container body constituent sheet material was prepared in the same manner as in Example 1, except that a laminate film of a transparent vapor-deposited biaxially stretched PET layer having a thickness of 12 μm/a Dry layer/a biaxially stretched Ny layer having a thickness of 15 μm/a Dry layer/an LLDPE layer having a thickness of 30 μm in order from the outside was used as the first film layer, and a laminate film of an LLDPE layer having a thickness of 30 μm/a Dry layer/a biaxially stretched Ny layer having a thickness of 15 μm/a Dry layer/a transparent vapor-deposited biaxially stretched PET layer having a thickness of 12 μm in order from the outside was used as the second film layer.

Comparative Example 10

A container body constituent sheet material was prepared in the same manner as in Example 1, except that a laminate film of a transparent vapor-deposited biaxially stretched Ny layer having a thickness of 15 μm/a Dry layer/an LLDPE layer having a thickness of 20 μm in order from the outside was used as the first film layer, and a laminate film of an LLDPE layer having a thickness of 20 μm/a Dry layer/a transparent vapor-deposited biaxially stretched Ny layer having a thickness of 15 μm in order from the outside was used as the second film layer.

[Durability Test with Air Pressure of 60 kPa]

For Examples 5 and 6 and Comparative Examples 6 to 10, in the above [Durability test with air pressure of 60 kPa], the test was performed by only (a) standing at 40° C. and a humidity of 75% RH and (b) standing at 50° C. and a humidity of 20% RH. The results are shown in Table 2.

TABLE 2

| | Sheet material | Layer configuration | 60 kPa | |
| --- | --- | --- | --- | --- |
| | | | 40° C., 75% RH | 50° C., 20% RH |
| Example 5 | First film layer | PET 12 μm/Dry/LLDPE 30 μm/AD 4 μm/EVOH 10 μm/AD 4 μm/LLDPE 100 μm | Good | Good |
| | Second film layer | LLDPE 100 μm/AD 4 μm/EVOH 10 μm/AD 4 μm/LLDPE 30 μm/Dry/PET 12 μm | | |
| Example 6 | First film layer | PET 12 μm/LDPE 15 μm/LLDPE 30 μm/AD 4 μm/EVOH 10 μm/AD 4 μm/LLDPE 100 μm | Good | Good |
| | Second film layer | LLDPE 100 μm/AD 4 μm/EVOH 10 μm/AD 4 μm/LLDPE 30 μm/LDPE 15 μm/PET 12 μm | | |
| Comparative Example 6 | First film layer | PET 12 μm/Dry/LLDPE 25 μm/AD 4 μm/Ny 7.5 μm/AD 4 μm/EVOH 10 μm/AD 4 μm/Ny 7.5 μm/AD 4 μm/LLDPE 50 μm | Good | Poor (12 days) |
| | Second film layer | LLDPE 50 μm/AD 4 μm/Ny 7.5 μm/AD 4 μm/EVOH 10 μm/AD 4 μm/Ny 7.5 μm/AD 4 μm/LLDPE 25 μm/Dry/PET 12 μm | | |
| Comparative Example 7 | First film layer | PET 12 μm/LDPE 15 μm/LLDPE 25 μm/AD 4 μm pm/Ny 7.5 μm/AD 4 μm/EVOH 10 μm/AD 4 μm/Ny 7.5 μm/AD 4 μm/LLDPE 50 μm | Good | Very poor (6 days) |
| | Second film layer | LLDPE 50 μm/AD 4 μm/Ny 7.5 μm/AD 4 μm/EVOH 10 μm/AD 4 μm/Ny 7.5 μm/AD 4 μm/LLDPE 25 μm/LDPE 15 μm/PET 12 μm | | |
| Comparative Example 8 | First film layer | PET 12 μm/Dry/vapor-deposited PET 12 μm/Dry/Ny 15 μm/Dry/LLDPE 50 μm | Poor (1 day) | Very poor (1 day) |
| | Second film layer | LLDPE 50 μm/Dry/Ny 15 μm/Dry/vapor-deposited PET 12 μm/Dry/PET 12 μm | | |
| Comparative Example 9 | First film layer | Vapor-deposited PET 12 μm/Dry/Ny 15 μm/Dry/LLDPE 30 μm | Very poor (1 day) | Very poor (1 day) |
| | Second film layer | LLDPE 30 μm/Dry/Ny 15 μm/Dry/vapor-deposited PET 12 μm | | |
| Comparative Example 10 | First film layer | Vapor-deposited Ny 15 μm/Dry/LLDPE 20 μm | Very poor (1 day) | Very poor (1 day) |
| | Second film layer | LLDPE 20 μm/Dry/vapor-deposited Ny 15 μm | | |

Example 7

A container body constituent sheet material was prepared in the same manner as in Example 1, except that a film of a biaxially stretched PET layer having a thickness of 12 μm/a Dry layer/an LLDPE layer having a thickness of 30 μm/an AD layer having a thickness of 4 μm/an EVOH layer having a thickness of 10 μm/an AD layer having a thickness of 4 μm/an LLDPE layer having a thickness of 100 μm in order from the outside was used as the first film layer, and a film of an LLDPE layer having a thickness of 100 μm/an AD layer having a thickness of 4 μm/an EVOH layer having a thickness of 10 μm/an AD layer having a thickness of 4 μm/an LLDPE layer having a thickness of 30 μm/a Dry layer/a biaxially stretched PET layer having a thickness of 12 μm in order from the outside was used as the second film layer. A coextruded film was used for the LLDPE layer/the AD layer/the EVOH layer/the AD layer/the LLDPE layer of the first film layer and the second film layer.

Example 8

A container body constituent sheet material was prepared in the same manner as in Example 1, except that a film of a biaxially stretched PET layer having a thickness of 12 μm/an LDPE layer having a thickness of 15 μm/an LLDPE layer having a thickness of 30 μm/an AD layer having a thickness of 4 μm/an EVOH layer having a thickness of 10 μm/an AD layer having a thickness of 4 μm/an LLDPE layer having a thickness of 100 μm in order from the outside was used as the first film layer, and a film of an LLDPE layer having a thickness of 100 μm/an AD layer having a thickness of 4 μm/an EVOH layer having a thickness of 10 μm/an AD layer having a thickness of 4 μm/an LLDPE layer having a thickness of 30 μm/an LDPE layer having a thickness of 15 μm/a biaxially stretched PET layer having a thickness of 12 μm in order from the outside was used as the second film layer.

This film was an extruded film formed by melt-extruding LDPE with a thickness of 15 μm between a coextruded film of an LLDPE layer having a thickness of 30 μm/an AD layer having a thickness of 4 μm/an EVOH layer having a thickness of 10 μm/an AD layer having a thickness of 4 μm/an LLDPE layer having a thickness of 100 μm and a biaxially stretched PET film having a thickness of 12 μm. An anchor coat layer was provided in advance on one side (melt extruded surface of LDPE) of the biaxially stretched PET film.

Example 9

A container body constituent sheet material was prepared in the same manner as in Example 1, except that a coextruded film of an LLDPE layer having a thickness of 18 μm/an AD layer having a thickness of 4 μm/an EVOH layer having a thickness of 6 μm/an AD layer having a thickness of 4 μm/an LLDPE layer having a thickness of 18 μm in order from the outside was used as the first film layer, and a coextruded film of an LLDPE layer having a thickness of 18 μm/an AD layer having a thickness of 4 μm/an EVOH layer having a thickness of 6 μm/an AD layer having a thickness of 4 μm/an LLDPE layer having a thickness of 18 μm in order from the outside was used as the second film layer.

Example 10

A container body constituent sheet material was prepared in the same manner as in Example 1, except that a film of a transparent vapor-deposited biaxially stretched PET layer having a thickness of 12 μm/a Dry layer/an LLDPE layer having a thickness of 18 μm/an AD layer having a thickness of 4 μm/an EVOH layer having a thickness of 6 μm/an AD layer having a thickness of 4 μm/an LLDPE layer having a thickness of 18 μm in order from the outside was used as the first film layer, and a coextruded film of an LLDPE layer having a thickness of 18 μm/an AD layer having a thickness of 4 μm/an EVOH layer having a thickness of 6 μm/an AD layer having a thickness of 4 μm/an LLDPE layer having a thickness of 18 μm in order from the outside was used as the second film layer.

A coextruded film was used for the LLDPE layer/the AD layer/the EVOH layer/the AD layer/the LLDPE layer of the first film layer. The first film layer was prepared by laminating a transparent vapor-deposited biaxially stretched PET film on the coextruded film via a dry laminate adhesive (Dry).

Example 11

A container body constituent sheet material was prepared in the same manner as in Example 1, except that a film of a biaxially stretched LLDPE layer having a thickness of 40 μm/an LDPE layer having a thickness of 15 μm/an LLDPE layer having a thickness of 18 μm/an AD layer having a thickness of 4 μm/an EVOH layer having a thickness of 6 μm/an AD layer having a thickness of 4 μm/an LLDPE layer having a thickness of 18 μm in order from the outside was used as the first film layer, and a coextruded film of an LLDPE layer having a thickness of 18 μm/an AD layer having a thickness of 4 μm/an EVOH layer having a thickness of 6 μm/an AD layer having a thickness of 4 μm/an LLDPE layer having a thickness of 18 μm in order from the outside was used as the second film layer.

The first film layer used in Example 11 is an extruded film formed by using a biaxially stretched LLDPE layer (biaxially stretched LLDPE film) having a thickness of 40 μm instead of the transparent vapor-deposited biaxially stretched PET layer (transparent vapor-deposited biaxially stretched PET film) having a thickness of 12 μm of the first film layer of Example 10 and melt-extruding LDPE with a thickness of 15 μm between the biaxially stretched LLDPE film and a coextruded film of an LLDPE layer having a thickness of 18 μm/an AD layer having a thickness of 4 μm/an EVOH layer having a thickness of 6 μm/an AD layer having a thickness of 4 μm/an LLDPE layer having a thickness of 18 μm.

Comparative Example 11

A container body constituent sheet material was prepared in the same manner as in Example 1, except that a laminate film of an LLDPE layer having a thickness of 20 μm/a Dry layer/a biaxially stretched EVOH layer having a thickness of 12 μm/a Dry layer/an LLDPE layer having a thickness of 25 μm in order from the outside was used as the first film layer, and a laminate film of an LLDPE layer having a thickness of 25 μm/a Dry layer/a biaxially stretched EVOH layer having a thickness of 12 μm/a Dry layer/an LLDPE layer having a thickness of 20 μm in order from the outside was used as the second film layer.

Comparative Example 12

A container body constituent sheet material was prepared in the same manner as in Example 1, except that a laminate film of a transparent vapor-deposited biaxially stretched PET layer having a thickness of 12 μm/a Dry layer/an LLDPE layer having a thickness of 20 μm/a Dry layer/a biaxially stretched EVOH layer having a thickness of 12 μm/a Dry layer/an LLDPE layer having a thickness of 25 μm in order from the outside was used as the first film layer, and a laminate film of an LLDPE layer having a thickness of 25 μm/a Dry layer/a biaxially stretched EVOH layer having a thickness of 12 μm/a Dry layer/an LLDPE layer having a thickness of 20 μm in order from the outside was used as the second film layer.

[Durability Test with Air Pressure of 40 kPa]

A sheet material container having a container body and an inner container was prepared using the first film layer and the second film layer of Examples 7 to 11 and Comparative Examples 11 and 12 and the inner container constituent sheet material.

Regarding Examples 7 and 8

As the inner container constituent sheet material, a film of an LLDPE layer having a thickness of 25 μm/a Dry layer/a transparent vapor-deposited biaxially stretched PET layer having a thickness of 12 μm/a Dry layer/a biaxially stretched Ny layer having a thickness of 15 μm/an LLDPE layer having a thickness of 50 μm was provided. The inner container constituent sheet material was formed into a shape as illustrated in FIG. 11.

On the other hand, the first film layer and the second film layer of Example 7 were each formed into a shape as illustrated in FIG. 23, and these layers were overlaid on one another, and heat-sealed at a portion other than the non-joint portion, whereby a container body constituent sheet material as illustrated in FIG. 24 was prepared. The inner container constituent sheet material is overlaid on the container body constituent sheet material, and the peripheral edge portion of the container body constituent sheet material (exposed LLDPE layer of the first film layer) and the peripheral edge portion of the inner container constituent sheet material (LLDPE layer) are joined by heat sealing. After the container body constituent sheet material with an inner container was bent and the peripheral edge portions thereof were heat-sealed, air was introduced (air pressure 40 kPa) as a filler into the enclosing portion (non-joint portion) from the inlet, and the inlet was heat-sealed in that state and closed, whereby a sheet material container having a container body and an inner container as illustrated in FIG. 26 was prepared.

The first film layer and the second film layer of Example 8 were also processed into a sheet material container having a container body and an inner container as illustrated in FIG. 26 in the same manner as in Example 7.

Regarding Example 9 and Comparative Example 11

As the inner container constituent sheet material, a film of an LLDPE layer having a thickness of 25 μm/a Dry layer/a transparent vapor-deposited biaxially stretched PET layer having a thickness of 12 μm/a Dry layer/a biaxially stretched Ny layer having a thickness of 15 μm/an LLDPE layer having a thickness of 50 μm was prepared. The inner container constituent sheet material was formed into a shape as illustrated in FIG. 11.

On the other hand, the first film layer and the second film layer of Example 9 were each formed into a shape as illustrated in FIG. 7, and these layers were overlaid on one another, and heat-sealed at a portion other than the non-joint portion, whereby a container body constituent sheet material as illustrated in FIG. 6 was prepared. The inner container constituent sheet material is overlaid on the container body constituent sheet material, and the peripheral edge portion of the container body constituent sheet material (LLDPE layer of the second film layer) and the peripheral edge portion of the inner container constituent sheet material (LLDPE layer) are joined by heat sealing. After the container body constituent sheet material with an inner container was bent and the peripheral edge portions thereof were heat-sealed, air was introduced (air pressure 40 kPa) as a filler into the enclosing portion (non-joint portion) from the inlet, and the inlet was heat-sealed in that state and closed, whereby a sheet material container having a container body and an inner container as illustrated in FIG. 13 was prepared.

The first film layer and the second film layer of Comparative Example 11 were also processed into a sheet material container having a container body and an inner container as illustrated in FIG. 13 in the same manner as in Example 9.

Regarding Example 10 and Comparative Example 12

As the inner container constituent sheet material, a film of an LLDPE layer having a thickness of 25 μm/a Dry layer/a transparent vapor-deposited biaxially stretched PET layer having a thickness of 12 μm/a Dry layer/a biaxially stretched Ny layer having a thickness of 15 μm/an LLDPE layer having a thickness of 50 μm was prepared. The inner container constituent sheet material was formed into a shape as illustrated in FIG. 16A.

On the other hand, the first film layer and the second film layer of Example 10 were each formed into a shape as illustrated in FIG. 14, and these layers were overlaid on one another, and heat-sealed at the joint portion, whereby a container body constituent sheet material as illustrated in FIG. 15 was prepared. The inner container constituent sheet material was overlaid on the container body constituent sheet material, and the peripheral edge portion of the container body constituent sheet material (LLDPE layer of the second film layer) and the peripheral edge portion of the inner container constituent sheet material (LLDPE layer) were joined by heat sealing, whereby a container body constituent sheet material with an inner container as illustrated in FIG. 16B was prepared. After the container body constituent sheet material with an inner container was bent and the peripheral edge portions thereof were heat-sealed, air was introduced (air pressure 40 kPa) as a filler into the enclosing portion from the inlet, and the inlet was heat-sealed in that state and closed, whereby a sheet material container having a container body and an inner container as illustrated in FIG. 20 was prepared.

The first film layer and the second film layer of Comparative Example 12 were also processed into a sheet material container having a container body and an inner container as illustrated in FIG. 20 in the same manner as in Example 10.

Regarding Example 11

A container body constituent sheet material with an inner container was prepared in the same manner as in Example 10 except that a coextruded film of an LLDPE layer having a thickness of 50 μm/an AD layer having a thickness of 4 μm/an EVOH layer having a thickness of 6 μm/an AD layer having a thickness of 4 μm/an LLDPE layer having a thickness of 50 μm was used as the inner container constituent sheet material and the first film layer and the second film layer of Example 11 were used, and a sheet material container having a container body and an inner container as illustrated in FIG. 20 was prepared.

Each sheet material container (sample) in which the enclosing portion having an internal pressure of 40 kPa was formed in this way was allowed to stand at (a) 40° C. and a humidity of 75% RH and allowed to stand at (b) 50° C. and a humidity of 20% RH, and similarly, the state of each sample was checked every day. The results are shown in Table 3.

[Measurement of Tensile Elongation]

The first film layer used in Example 10 is a laminate film in which a transparent vapor-deposited biaxially stretched PET layer having a thickness of 12 μm and a coextruded film (an LLDPE layer having a thickness of 18 μm/an AD layer having a thickness of 4 μm/an EVOH layer having a thickness of 6 μm/an AD layer having a thickness of 4 μm/an LLDPE layer having a thickness of 18 μm) are bonded using a dry laminate adhesive (Dry layer). Before the transparent vapor-deposited biaxially stretched PET layer was bonded, each tensile elongation in the MD direction and the TD direction of the coextruded film (an LLDPE layer having a thickness of 18 μm/an AD layer having a thickness of 4 μm/an EVOH layer having a thickness of 6 μm/an AD layer having a thickness of 4 μm/an LLDPE layer having a thickness of 18 μm) was measured. As a result, the tensile elongation in the MD direction of the coextruded film of Example 10 was about 360%, and the tensile elongation in the TD direction was about 420%. The second film layer of Example 10 is the same as the coextruded film whose tensile elongation has been measured. The coextruded film of Example 11 is also the same as the coextruded film whose tensile elongation has been measured.

The first film layer used in Comparative Example 12 is a laminate film in which a transparent vapor-deposited biaxially stretched PET layer having a thickness of 12 μm and a laminate film (an LLDPE layer having a thickness of 20 μm/a Dry layer/a biaxially stretched EVOH layer having a thickness of 12 μm/a Dry layer/an LLDPE layer having a thickness of 25 μm) are bonded using a dry laminate adhesive (Dry layer). Before the transparent vapor-deposited biaxially stretched PET layer was bonded, each tensile elongation in the MD direction and the TD direction of the laminate film (an LLDPE layer having a thickness of 20 μm/a Dry layer/a biaxially stretched EVOH layer having a thickness of 12 μm/a Dry layer/an LLDPE layer having a thickness of 25 μm) was measured. As a result, the tensile elongation in the MD direction of the laminate film of Comparative Example 12 was about 110%, and the tensile elongation in the TD direction was about 88%. The second film layer of Comparative Example 12 is the same as the laminate film whose tensile elongation has been measured.

The tensile elongation in the MD direction was measured by the following procedure. From the films of Example 10 and Comparative Example 12, test pieces having a length in the MD direction of 200 mm and a length in the TD direction of 15 mm were cut out. The test piece was set on a measuring instrument Autograph (manufactured by Shimadzu Corporation: AG-X plus 500N) (distance between chucks: 50 mm), pulled under standard conditions at a tensile speed of 300 mm/min, and stretched in the MD direction until the test piece broke, and the length of the test piece before the test and the length of the test piece when the test piece broke were measured. By substituting the length into the following formula, the tensile elongation in the MD direction was calculated.

The tensile elongation in the TD direction was calculated in the same manner as the procedure of the tensile test in the MD direction (that is, in the procedure for measuring the tensile elongation in the TD direction, "MD" in the procedure of the tensile test in the MD direction was read as "TD", and "TD" was read as "MD").

Formula: Tensile elongation $(\%) = 100 \times (L - L0)/L0$. However, L in the above formula represents the length of the test piece in the MD direction (or TD direction) before the test, and L0 represents the length of the test piece in the MD direction (or TD direction) during breaking.

TABLE 3

| | | | 60 kPa | |
| --- | --- | --- | --- | --- |
| Sheet material | | Layer configuration | 40° C., 75% RH | 50° C., 20% RH |
| Example 7 | First film layer | PET 12 μm/Dry/LLDPE 30 μm/AD 4 μm/EVOH 10 μm/AD 4 μm/LLDPE 100 μm | Good | Good |
| | Second film layer | LLDPE 100 μm/AD 4 μm/EVOH 10 μm/AD 4 μm/LLDPE 30 μm/Dry/PET 12 μm | | |
| Example 8 | First film layer | PET 12 μm/LLDPE 15 μm/LLDPE 30 μm/AD 4 μm/EVOH 10 μm/AD 4 μm/LLDPE 100 μm | Good | Good |
| | Second film layer | LLDPE 100 μm/AD 4 μm/EVOH 10 μm/AD 4 μm/LLDPE 30 μm/LDPE 15 μm/PET 12 μm | | |
| Example 9 | First film layer | LLDPE 18 μm/AD 4 μm/EVOH 6 μm/AD 4 μm/LLDPE 18 μm | Good | Good |
| | Second film layer | LLDPE 18 μm/AD 4 μm/EVOH 6 μm/AD 4 μm/LLDPE 18 μm | | |
| Example 10 | First film layer | Vapor-deposited PET 12 μm/Dry/LLDPE 18 μm/AD 4 μm/EVOH 6 μm/AD 4 μm/LLDPE 18 μm | Good | Good |
| | Second film layer | LLDPE 18 μm/AD 4 μm/EVOH 6 μm/AD 4 μm/LLDPE 18 μm | | |
| Example 11 | First film layer | Stretched LLDPE 40 μm/LDPE 15 μm/LLDPE 18 μm/AD 4 μm/EVOH 6 μm/AD 4 μm/LLDPE 18 μm | Good | Good |
| | Second film layer | LLDPE 18 μm/AD 4 μm/EVOH 6 μm/AD 4 μm/LLDPE 18 μm | | |
| Comparative Example 11 | First film layer | LLDPE 20 μm/Dry/EVOH 12 μm/Dry/LLDPE 25 μm | Poor (1 day) | Poor (1 day) |
| | Second film layer | LLDPE 25 μm/Dry/EVOH 12 μm/Dry/LLDPE 20 μm | | |
| Comparative Example 12 | First film layer | Vapor-deposited PET 12 μm/Dry/LLDPE 20 μm/Dry/EVOH 12 μm/Dry/LLDPE 25 μm | Poor (1 day) | Poor (1 day) |
| | Second film layer | LLDPE 25 μm/Dry/EVOH 12 μm/Dry/LLDPE 20 μm | | |

DESCRIPTION OF REFERENCE SIGNS

1: First film layer 11, 13: Polyolefin resin layer of first film layer

12: Ethylene-vinyl alcohol copolymer resin layer of first film layer

16: Polyester resin layer of first film layer

2: Second film layer 21, 23: Polyolefin resin layer of second film layer

22: Ethylene-vinyl alcohol copolymer resin layer of second film layer

3: Sheet material (container body constituent sheet material)
5: Sheet material container
51: Enclosing portion
53: Accommodation space
6: Container body
7: Inner container

The invention claimed is:

1. A sheet material container comprising:
a container body; and
an inner container that is covered by the container body and defines an accommodation space,
wherein the container body is formed of a sheet material including a first film layer and a second film layer disposed inside the first film layer,
wherein the sheet material of the container body has a joint portion at which an interlayer between the first film layer and the second film layer is joined and an enclosing portion in which a filler can be enclosed in the interlayer between the first film layer and the second film layer,
wherein the first film layer has a coextruded multilayer structural part having a polyolefin resin layer/an adhesive layer/an ethylene-vinyl alcohol copolymer resin layer/an adhesive layer/a polyolefin resin layer on a side facing the enclosing portion,
wherein the second film layer has a coextruded multilayer structural part having a polyolefin resin layer/an adhesive layer/a ethylene-vinyl alcohol copolymer resin layer/an adhesive layer/a polyolefin resin layer on a side facing the enclosing portion,
wherein a tensile elongation in a MD direction and/or a TD direction of the coextruded multilayer structural part of the first film layer is 300% or more and 900% or less, and
wherein a tensile elongation in a MD direction and/or a TD direction of the coextruded multilayer structural part of the second film layer is 300% or more and 900% or less.

2. The sheet material container according to claim 1, wherein the polyolefin resin layers of the second film layer are linear low-density polyethylene resin layers.

3. The sheet material container according to claim 1, wherein the polyolefin resin layers of the first film layer are linear low-density polyethylene resin layers.

4. The sheet material container according to claim 1, wherein the first film layer has the coextruded multilayer structural part and a polyester resin layer stacked on an outside of the coextruded multilayer structural part, and
the polyester resin layer constitutes an outer surface of the container body.

5. The sheet material container according to claim 1, wherein the filler is enclosed in the enclosing portion.

6. The sheet material container according to claim 1, wherein the first film layer has the coextruded multilayer structural part and a stretched polyethylene resin layer stacked on an outside of the coextruded multilayer structural part, and
the stretched polyethylene resin layer constitutes an outer surface of the container body.

7. The sheet material container according to claim 6, wherein the stretched polyethylene resin layer is formed by biaxial stretching.

8. The sheet material container according to claim 6, wherein the polyolefin resin layers of the first film layer are polyethylene resin layers, and an average molecular weight of a polyethylene resin used for each of the polyethylene resin layers and an average molecular weight of a polyethylene resin used for the stretched polyethylene resin layer are the same.

9. The sheet material container according to claim 6, wherein the first film layer is formed by melt-extruding a polyethylene resin between the coextruded multilayer structural part and the stretched polyethylene resin layer.

10. The sheet material container according to claim 1, wherein the inner container is formed of an inner container constituent sheet material to which a peripheral edge portion is joined.

11. The sheet material container according to claim 10, wherein the inner container constituent sheet material has a multilayer film having at least two kinds selected from a polyolefin resin layer, an ethylene-vinyl alcohol copolymer resin layer, and a nylon resin layer.

* * * * *